US011849232B2

(12) United States Patent
Kim

(10) Patent No.: US 11,849,232 B2
(45) Date of Patent: Dec. 19, 2023

(54) INTEGRATED IMAGE SENSOR WITH INTERNAL FEEDBACK AND OPERATION METHOD THEREOF

(71) Applicant: SAMSUNG ELECTRONICS CO., LTD., Suwon-si (KR)

(72) Inventor: Woo-Shik Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 134 days.

(21) Appl. No.: 17/496,303

(22) Filed: Oct. 7, 2021

(65) Prior Publication Data
US 2022/0141412 A1    May 5, 2022

(30) Foreign Application Priority Data

Nov. 3, 2020 (KR) .................. 10-2020-0145529
Jun. 28, 2021 (KR) .................. 10-2021-0084160

(51) Int. Cl.
*H04N 25/75* (2023.01)
*H04N 25/709* (2023.01)
*H04N 25/771* (2023.01)
*H04N 25/772* (2023.01)

(52) U.S. Cl.
CPC ........... *H04N 25/75* (2023.01); *H04N 25/709* (2023.01); *H04N 25/771* (2023.01); *H04N 25/772* (2023.01)

(58) Field of Classification Search
None
See application file for complete search history.

(56) References Cited

U.S. PATENT DOCUMENTS

| 2004/0036010 A1* | 2/2004 | Hsieh | H04N 23/71 257/E31.062 |
|---|---|---|---|
| 2006/0187315 A1 | 8/2006 | Yokonuma | |
| 2009/0066782 A1 | 3/2009 | Choi et al. | |
| 2010/0231747 A1 | 9/2010 | Yim | |
| 2012/0093399 A1* | 4/2012 | Paik | H04N 23/84 382/164 |
| 2012/0265660 A1 | 10/2012 | Paek et al. | |

(Continued)

FOREIGN PATENT DOCUMENTS

JP    2006-157348 A    6/2006
JP    2019-176481 A    10/2019

(Continued)

OTHER PUBLICATIONS

Sony "Sony to Release World's First Intelligent Vision Sensor with AI Processing Functionality: Enabling High-Speed Edge AI Processing and Contributing to Building of Optimal Systems Linked with the Cloud", May 14, 2020, 5 total pages, https://www.sony.net/SonyInfo/News/Press/202005/20-037E/.

(Continued)

Primary Examiner — Mark T Monk
(74) Attorney, Agent, or Firm — Sughrue Mion, PLLC

(57) ABSTRACT

An integrated image sensor includes a pixel array; an analog circuit configured to control the pixel array and read out image data based on an output signal of the pixel array; a processor configured to generate a control signal for controlling the analog circuit based on the image data and to feed back the control signal to the analog circuit; and a memory storing the image data.

20 Claims, 23 Drawing Sheets

(56) References Cited

U.S. PATENT DOCUMENTS

| | | | |
|---|---|---|---|
| 2015/0169964 A1* | 6/2015 | Finn | G08B 13/19652 |
| | | | 382/103 |
| 2015/0365617 A1 | 12/2015 | Chen | |
| 2019/0103432 A1 | 4/2019 | Shim et al. | |
| 2020/0195875 A1* | 6/2020 | Berkovich | H04N 23/61 |
| 2020/0288052 A1* | 9/2020 | Mittra | H04N 23/76 |
| 2022/0141401 A1 | 5/2022 | Kim et al. | |

FOREIGN PATENT DOCUMENTS

| | | |
|---|---|---|
| KR | 10-2012-0116787 A1 | 10/2012 |
| KR | 101594292 B1 | 2/2016 |
| KR | 10-2016-0040981 A | 4/2016 |
| KR | 10-2019-0038032 A | 4/2019 |
| KR | 10-2022-0059904 A | 5/2022 |
| WO | 2017/031205 A1 | 2/2017 |

OTHER PUBLICATIONS

Emil Martinec, "Noise, Dynamic Range and Bit Depth in Digital SLRs", May 22, 2008, 7 total pages, https://homes.psd.uchicago.edu/~ejmartin/pix/20d/tests/noise/#shotnoise.

Hellot, "Evolving CMOS Image Sensor", Mar. 2010, 13 total pages, http://magazine.hellot.net/magz/article/articleDetail.do?flag=all&showType=showType1&articleId=ARTI_000000000037061&articleAllListSortType=sort_1&page=1&selectYearMonth=201003&subCtgId.

Tachynoll, "CMOS Image Sensor", Dec. 11, 2018, 21 total pages, https://tachynoll.wordpress.com/2018/12/11/%EC%9D%B4%EB%AF%B8%EC%A7%80- %EC%84%BC%EC%84%9C%EC%9D%98-%EA%B8%B0%EB%B3%B8-%EA%B5%AC%EC%A1%B0-cmos-image-sensor/.

Partial European Search Report dated Feb. 22, 2022 by the European Patent Office in counterpart European Application No. 21205944.8.

\* cited by examiner

[Security]

5700

5800

INTEGRATED IMAGE SENSOR WITH INTERNAL FEEDBACK AND OPERATION METHOD THEREOF

CROSS REFERENCE TO RELATED APPLICATION

This application is based on and claims priority under 35 U.S.C. § 119 to Korean Patent Application No. 10-2020-0145529, filed on Nov. 3, 2020, in the Korean Intellectual Property Office, and Korean Patent Application No. 10-2021-0084160, filed on Jun. 28, 2021, in the Korean Intellectual Property Office, the disclosures of which are incorporated by reference herein in their entireties.

BACKGROUND

1. Field

Apparatuses and methods consistent with example embodiments relate to integrated image sensors with internal feedback and an operation method thereof.

2. Description of Related Art

Image sensors are devices that receive light incident thereon from the outside, photoelectric-convert the received light, and generate an electrical signal. Image sensors may be classified into charge coupled devices (CCDs) and complementary metal oxide semiconductor (CMOS) devices according to the structures thereof.

CMOS image sensors are also referred to as CIS. CMOS image sensors may be divided into passive image sensors using one transistor and active image sensors using three or more transistors according to a pixel structure.

In general, an image is provided to a user through a process in which an image sensor captures the image and an external processor corrects the image. There is a limit to improving the quality of an image when the external processor corrects the image based on an already captured image. Therefore, to provide a high quality image, an image sensor capable of adaptively capturing an image is required.

SUMMARY

One or more example embodiments provide integrated image sensors with an internal feedback and operation methods thereof.

According to an aspect of an example embodiment, an integrated image sensor includes a pixel array; an analog circuit configured to control the pixel array and read out image data based on an output signal of the pixel array; a processor configured to generate a control signal for controlling the analog circuit based on the image data and to feed back the control signal to the analog circuit; and a memory storing the image data.

The processor may be further configured to determine a sub region of the image data and feed back information of the sub region to the analog circuit, and the analog circuit may be configured to control pixels corresponding to the sub region or to process the output signal of each of the pixels corresponding to the sub region according to the control signal.

The processor may be further configured to determine the sub region by performing digital image processing on the image data.

The processor may be configured to determine the sub region based on a motion, an object, a color, a dynamic range, or a noise of the image data.

The analog circuit may be configured to adjust an exposure time, a conversion gain, or a dynamic range of the pixels corresponding to the sub region according to the control signal.

The analog circuit may be configured to read out first image data from the pixels that correspond to the sub region, and read out second image data from pixels that do not correspond to the sub region at different frame rates according to the control signal.

The analog circuit may be configured to perform binning on the pixels corresponding to the sub region according to the control signal.

The processor may be configured to determine a first sub region and a second sub region of the image data, and feedback information of the first sub region and the second sub region to the analog signal processing circuit. The analog circuit may be configured to control pixels corresponding to the first sub region and pixels corresponding to the second sub region to operate differently from each other, or process first output signals of the pixels corresponding to the first sub region and second output signals of the pixels corresponding to the second sub region differently from each other, according to the control signal.

The analog circuit is configured to read out first sub image data based on the first output signals of the pixels corresponding to the first sub region, and read out second sub image data based on the second output signals of the pixels corresponding to the second sub region. The processor may be further configured to generate entire image data by combining the first sub image data and the second sub image data based on image registration.

The analog circuit may include: a row select circuit configured to activate pixels of the pixel array; and an analog signal processing circuit configured to read out the image data from the pixel array.

According to an aspect of another example embodiment, a method of operating an integrated image sensor includes reading out image data from a pixel array; storing the image data; based on the image data, generating a control signal for controlling the pixel array and for controlling an analog circuit configured to read out the image data; and feeding back the control signal to the analog circuit.

The generating of the control signal may include: determining a sub region of the image data, and the feeding back of the control signal may include: feeding back information of the sub region to the analog circuit.

The determining of the sub region may include: determining the sub region based on a motion, an object, a color, a dynamic range, or a noise of the image data.

The method may further include: controlling pixels corresponding to the sub region or processing output signals of the pixels corresponding to the sub region according to the control signal.

The controlling of the pixels corresponding to the sub region or the processing of the output signals of the pixels corresponding to the sub region may include: adjusting, according to the control signal, an exposure time, a conversion gain, or a dynamic range of the pixels corresponding to the sub region.

The controlling of the pixels corresponding to the sub region or the processing of the output signals of the pixels corresponding to the sub region may include: performing image readout based on the pixels that correspond to the sub region and performing image readout based on pixels that do not correspond to the sub region at different frame rates according to the control signal.

The controlling of the pixels corresponding to the sub region or the processing of the output signals of the pixels corresponding to the sub region may include: performing binning on the pixels corresponding to the sub region according to the control signal.

The generating of the control signal may include: determining a first sub region and a second sub region of the image data. The feeding back of the control signal to the analog circuit may include: feeding back information of the first sub region and the second sub region to the analog signal processing circuit. The method may further include: controlling first pixels corresponding to the first sub region and second pixels corresponding to the second sub region to operate differently from each other, or processing output signals of the first pixels corresponding to the first sub region and output signals of the second pixels corresponding to the second sub region differently from each other, according to the control signal.

The method may further include: reading out first sub image data based on the output signals of the first pixels corresponding to the first sub region, and reading out second sub image data based on the output signals of the second pixels corresponding to the second sub region, and generating entire image data by combining the first sub image data and the second sub image data based on image registration.

According to an aspect of another example embodiment, an image sensor may include a pixel array, an analog circuit, and a digital circuit that are integrated into a single chip via a three-dimensional (3D) stacking technology, wherein the analog circuit may be configured to control the pixel array and read out image data from the pixel array, and wherein the digital circuit may include a processor configured to generate a feedback signal based on the image data read by the analog circuit, and provide the feedback signal to the analog circuit to enable the analog circuit to set a region of interest (ROI) and adjust at least one of an exposure time, a conversion gain, or a dynamic range of the image sensor to be applied to the ROI, based on the feedback signal.

BRIEF DESCRIPTION OF THE DRAWINGS

The above and/or other aspects will be more apparent by describing certain example embodiments, with reference to the accompanying drawings, in which.

DETAILED DESCRIPTION

Figure 1:
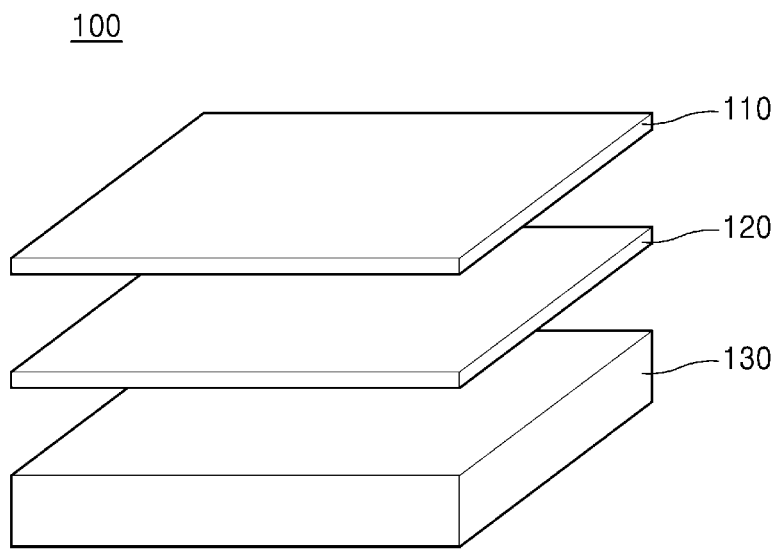
FIG. 1 shows an integrated image sensor with internal feedback according to an example embodiment.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

The terms used in the present disclosure are selected based on general terms currently widely used in the art in consideration of functions regarding the present disclosure, but the terms may vary according to the intention of those of ordinary skill in the art, precedents, or new technology in the art. Also, some terms may be arbitrarily selected by the applicant, and in this case, the meaning of the selected terms will be described in the detailed description of the present disclosure. Thus, the terms used herein should not be construed based on only the names of the terms but should be construed based on the meaning of the terms together with the description throughout the present disclosure.

Terms such as "including" or "comprising" used in the embodiments should not be construed as necessarily including all of various components, or various operations described in the specification, and it should be construed that some of the components or some of the operations may not be included or may further include additional components or operations.

Hereinafter, the present disclosure will now be described more fully with reference to the accompanying drawings. The disclosure may, however, be embodied in many different forms and should not be construed as being limited to the embodiments set forth herein.

FIG. 1 shows an integrated image sensor 100 with an internal feedback according to an example embodiment.

In an example embodiment, the integrated image sensor 100 includes a pixel layer 110, a memory layer 120, and a logic layer 130. The pixel layer 110, the memory layer 120, and the logic layer 130 are stacked on top of each other via a three-dimensional (3D) stacking technology. The 3D stacking technology allows a digital circuit (e.g., the memory layer 120, and the logic layer 130) to be integrated with a sensor circuit (e.g., the pixel array 110). The integrated image sensor 100 may be a system on chip. When the integrated image sensor 100 is implemented as the system on chip, the layers 110, 120, and 130 may be arranged in a horizontal or vertical structure. In addition, the logic layer 130 may be divided according to functions and disposed in a different location. For example, the integrated image sensor 100 may be implemented as the system on chip by connecting the layers 110, 120, and 130 through a through silicon via (TSV), but is not limited thereto.

The pixel layer 110 may be configured to capture an image. The pixel layer 110 may include a pixel array based on a charge coupled device (CCD) or a complementary metal oxide semiconductor (CMOS).

The memory layer 120 may be configured to store image data. Because the memory layer 120 is integrated in the integrated image sensor 100, the integrated image sensor 100 may include a memory having a capacity to store image data and/or programs.

The logic layer 130 may be configured to control operations of the pixel layer 110 and the memory layer 120 and to perform digital image processing. The logic layer 130 may include a processor for digital signal processing. Further, the logic layer 130 may include an analog circuit for controlling the pixel layer 110 and processing an output signal of the pixel layer 110.

The integrated image sensor 100 may include the memory layer 120 and the logic layer 130 integrated in the pixel layer 110, thereby performing various operations. For example, the logic layer 130 may read and analyze image data stored in the memory layer 120 to obtain parameters for capturing an image. For another example, the logic layer 130 may determine a sub region that requires parameter adjustment in the image data, and the pixel layer 110 may capture the sub region based on the adjusted parameter. In this regard, the parameters refer to general parameters used for capturing an image, such as sensitivity (ISO), exposure time, and gain.

The integrated image sensor 100 may be used in various platforms such as digital cameras, smart phones, PCs, laptops, portable devices, wearable devices, and vehicles.

Figure 2:
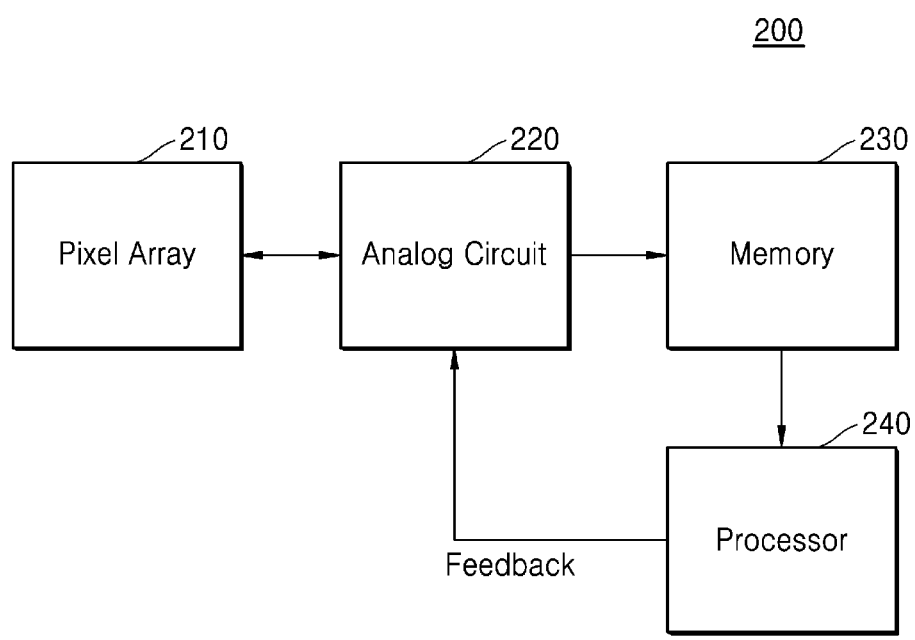
FIG. 2 is a diagram showing components of an integrated image sensor with internal feedback according to an example embodiment.

FIG. 2 is a diagram showing components of an integrated image sensor 200 with an internal feedback according to an example embodiment.

The integrated image sensor 200 according to an example embodiment includes a pixel array 210, an analog circuit 220, a memory 230, and a processor 240.

The pixel array 210 may be configured to capture an image. In an example embodiment, the pixel array 210 is implemented as a CMOS transistor, and the integrated image sensor 200 is classified as a CMOS image sensor (CIS). The embodiment is not limited thereto, and it is obvious to those skilled in the art that the integrated image sensor 200 may be implemented as a CCD image sensor in another example embodiment.

The memory 230 may be configured to store image data. The memory 230 may be configured to store image data captured by the pixel array 210 and image data on which digital image processing is performed by the processor 240. For example, the memory 230 may be implemented to have a capacity of GB. For example, the memory 230 may be implemented as a dynamic random access memory (DRAM), but is not limited thereto.

The processor 240 may be configured to generate a control signal for controlling the operation of the analog circuit 220 based on the image data. The processor 240 may determine whether parameter adjustment for image capture is necessary based on the image data, and may generate a control signal for parameter adjustment. The processor 240 may analyze motion, object, color, noise, dynamic range of image data (or a dynamic range of an image sensor), or a location where the image data is captured by digital image processing, and generate the control signal. The dynamic range may be represented by a ratio between a maximum measurable light intensity and a minimum measurable light intensity, or a maximum achievable signal divided by an image sensor noise.

Also, the processor 240 may be configured to determine a sub region of the image data. The processor 240 may determine the sub region requiring parameter adjustment for image capture. The processor 240 may determine the sub region by performing digital image processing on the image data. For example, the processor 240 may analyze motion, object, color, noise, or dynamic range of the image data by digital image processing, and may determine the sub region.

The processor 240 may be configured to determine a plurality of sub regions. The plurality of sub regions may be regions requiring different parameter adjustments. Alternatively, the plurality of sub regions may be spatially separated regions on the image.

For example, when a plurality of objects are detected, the processor 240 may determine the plurality of sub regions corresponding to the plurality of objects. For another example, when a plurality of regions beyond the dynamic range are detected, the processor 240 may determine the plurality of sub regions corresponding to the detected regions.

The processor 240 may be configured to feed back the control signal and/or the sub region to the analog circuit 220. The processor 240 may feed back the sub region of the pixel array 210 corresponding to the sub region of the image data to the analog circuit 220.

The processor 240 may be implemented as an array of a plurality of logic gates. Also, the processor 240 may be implemented as a combination of a microprocessor and a memory in which a program executable in the microprocessor is stored. Further, the processor 240 may include a hardware accelerator configured to perform machine learning. In addition, the processor 240 may include an application specific IC (ASIC) implemented for machine learning or image processing.

Meanwhile, the processor 240 may be implemented to include at least one processor (or processing unit). In addition, it may be understood by those of ordinary skill in the art that the processor 240 may be implemented as different types of hardware configurations.

The analog circuit 220 may be configured to control the pixel array 210 and read out the image data based on the control signal and/or the sub region fed back from the processor 240.

The analog circuit 220 may control the pixel array 210 to capture an image with the adjusted parameter according to the control signal, and read out the image data with the adjusted parameter. The analog circuit 220 may adjust the exposure time, conversion gain, or dynamic range of the pixel array 210. The analog circuit 220 may adjust the quantity of charge according to the exposure time of a pixel or perform dual sampling so as to adjust the dynamic range. The analog circuit 220 may perform pixel binning, white balance, or color enhancement according to the control signal.

Also, the analog circuit 220 may be configured to adjust an exposure time, a conversion gain, or a dynamic range of pixels corresponding to the sub region according to the control signal.

Also, the analog circuit 220 may be configured to perform image readout based on the pixels corresponding to the sub region and image readout based on pixels not corresponding to the sub region at different frame rates.

Also, the analog circuit 220 may be configured to read out sub regions of the pixel array 210 at different frame rates. The sub regions may be two or more regions. For example, the analog circuit 220 may be configured to read out first sub image data at a first frame rate based on output signals of pixels corresponding to a first sub region of the pixel array 210, and read out second sub image data at a second frame rate based on output signals of pixels corresponding to a second sub region of the pixel array 210.

Figure 3:
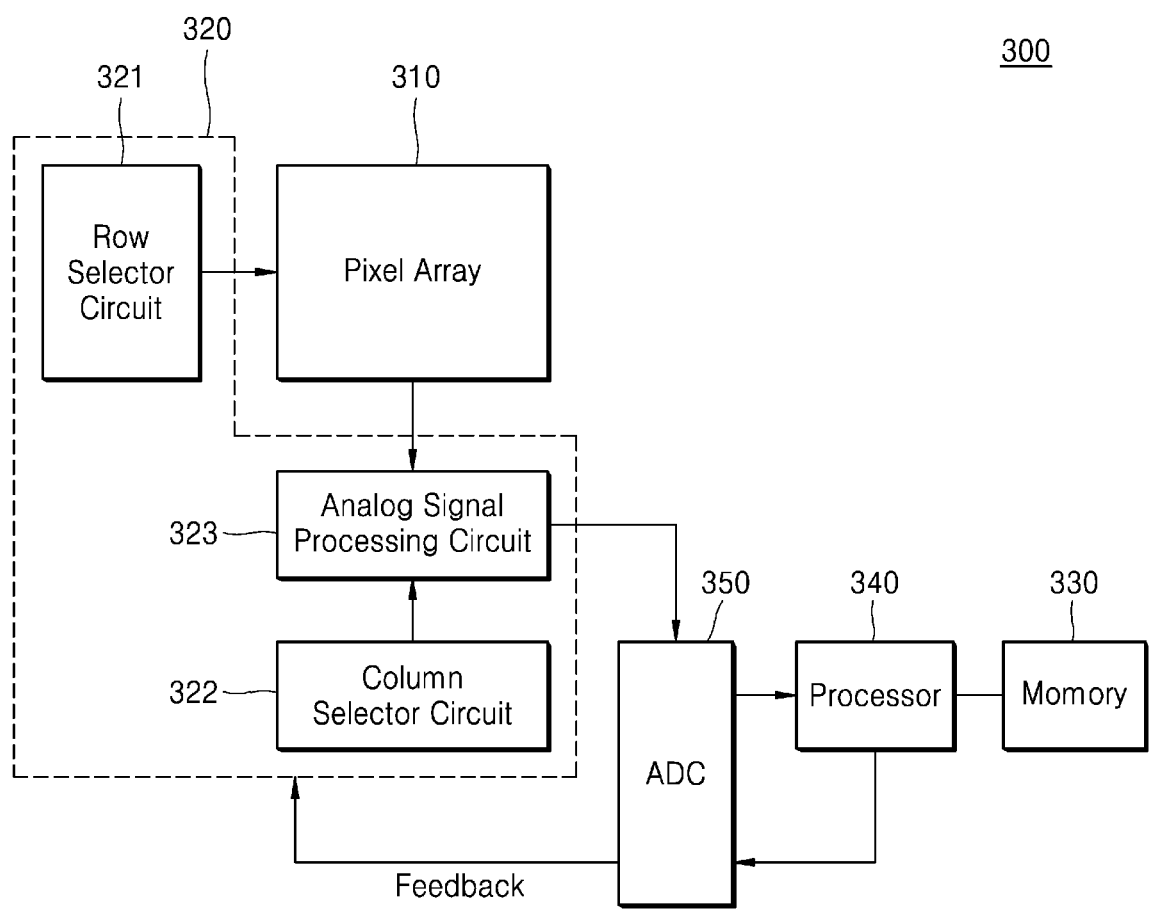
FIG. 3 is a diagram showing components of an integrated image sensor with internal feedback according to an example embodiment.

FIG. 3 is a diagram showing components of an integrated image sensor 300 with an internal feedback according to an example embodiment.

The integrated image sensor 300 according to an example embodiment includes a pixel array 310, an analog circuit 320, a memory 330, a processor 340, and an analog-to-digital converter (ADC) 350. The analog circuit 320 according to an example embodiment includes a row selector circuit 321, a column selector circuit 322, and an analog signal processing circuit 323. The integrated image sensor 300 may read out image data from pixels that are variably selected by the row selector circuit 321 and the column selector circuit 322 according to a feedback signal that is provided from a digital part (e.g., the processor 340) to an analog part (e.g. the analog circuit 320) of the integrated image sensor 300. The ADC 350 may convert an analog signal output from the analog signal processing circuit 323 to a digital signal, and may convert a digital signal output from the processor 340 to an analog signal.

The processor 340 may generate a control signal based on image data and determine a sub region of the image data. The analog circuit 320 may control a pixel array 310 and perform image readout based on the control signal and/or the sub region fed back from the processor 340.

The row selector circuit 321 may be configured to activate pixels of the pixel array 310 based on the control signal and/or the sub region. The row selector circuit 321 may activate the pixels in units of rows.

The analog signal processing circuit 323 may adjust exposure time of the pixels based on the control signal. The analog signal processing circuit 323 may control the pixel array 310 so that the exposure time of the pixels in the sub region is different from exposure time of pixels in the remaining region. Also, the analog signal processing circuit 323 may control the pixel array 310 so that exposure time of pixels in a first sub region and exposure time of pixels in a second sub region are different from each other.

The analog signal processing circuit 323 may adjust the quantity of charge according to the exposure time of the pixel. The analog signal processing circuit 323 may control the quantity of charge according to an exposure time of pixels in the sub region and the quantity of charge according to an exposure time of pixels in the remaining region to be different from each other. Also, the analog signal processing circuit 323 may control the pixel array 310 so that the quantity of charge according to the exposure time of the pixels of the first sub region and the quantity of charge according to the exposure time of the second sub region are different from each other.

The analog signal processing circuit 323 may be configured to perform image readout based on the control signal and/or the sub region.

The analog signal processing circuit 323 may adjust a conversion gain based on the control signal. The analog signal processing circuit 323 may adjust a conversion gain corresponding to the sub region and a conversion gain corresponding to the remaining region to be different from each other. Specifically, the analog signal processing circuit 323 may adjust the conversion gain with respect to the pixels corresponding to the sub region and the conversion gain with respect to the pixels corresponding to the remaining region to be different from each other. Also, the analog signal processing circuit 323 may adjust a conversion gain corresponding to the first sub region and a conversion gain corresponding to the second sub region to be different from each other.

The column selector circuit 322 may be configured to output a column selection signal with respect to readout based on the control signal and/or the sub region. The column selector circuit 322 may output the column selection signal for selecting columns of pixels corresponding to the sub region or all columns of the pixel array 310.

The analog signal processing circuit 323 may read out an output signal of pixels of all columns or an output signal of pixels corresponding to the sub region based on the column selection signal. Also, the analog signal processing circuit 323 may adjust a conversion gain with respect to the pixels in all the columns or a conversion gain with respect to the pixels corresponding to the sub region based on the column selection signal.

Because the pixels are controlled in units of rows by the row selector circuit 321 and output signals of the pixels are controlled in units of columns by the column selector circuit 322, the sub region may be set to an arbitrary shape. In other words, an exposure time, a conversion gain, a dynamic range, a readout frame rate, etc. of the pixels corresponding to the sub region may be selectively controlled.

In another example embodiment, the column select circuit 322 may be configured to activate the pixels of the pixel array 310 based on the control signal and/or the sub region. That is, the column selector circuit 322 may be configured to perform the same or similar function as the row selector circuit 321.

The analog circuit 320 may further include a motion detecting circuit. The motion detecting circuit may be configured to detect a motion between image frames based on analog signal processing.

The integrated image sensor 300 may further include a timing generating circuit. The row select circuit 321, the column select circuit 322, and/or the analog signal processing circuit 323 may be controlled by the timing generating circuit to sequentially perform a series of operations. It is obvious to those skilled in the art that in other embodiments, the timing generation circuit may be replaced by the processor 340.

The memory 330 may store image data output from the analog signal processing circuit 323. In addition, the memory 330 may store image data processed by the processor 340 or a program executed by the processor 340.

Figure 4:
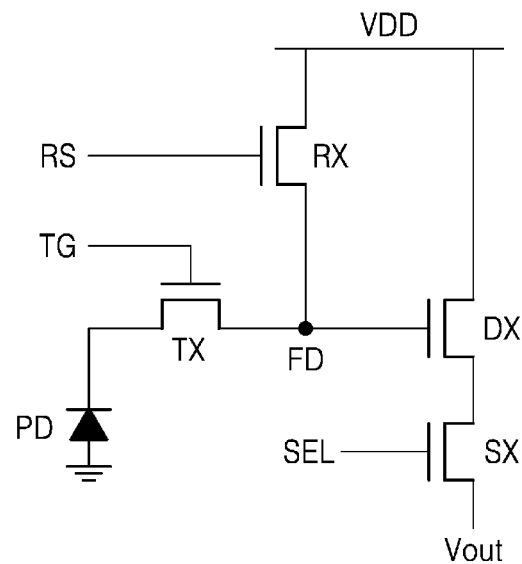
FIG. 4 is a diagram showing a pixel according to an example embodiment.

FIG. 4 is a diagram showing a pixel according to an example embodiment.

The pixel of an integrated image sensor according to an example embodiment may have a 4 transistor active pixel sensor (4T APS) structure. Unlike this, it is obvious to those of ordinary skill in the art that the pixel may be implemented as a 3T APS, a 5T APS, etc.

In an example embodiment, a transfer control signal TG, a reset signal RS, and a selection signal SEL may be output from a row selector circuit.

A photodiode PD generates charge according to incident light. The photodiode PD may be implemented as a photo transistor, a photo gate, or a pinned photo diode (PPD), but is not limited thereto.

A transfer transistor TX transfers the charge of the photodiode PD to a floating diffusion FD node in response to the transfer control signal TG. A reset transistor RX resets the floating diffusion FD node in response to the reset signal RS. A drive transistor DX functions as an amplifier that operates in response to the voltage of the floating diffusion FD node. A select transistor SX outputs an output signal Vout corresponding to the charge generated by the photodiode PD in response to the selection signal SEL.

The voltage of a gate of the transfer transistor TX is related to the maximum quantity of charge that the photodiode PD may accumulate. In an example embodiment, the row selector circuit may adjust the transfer control signal TG to adjust the quantity of charge of the photodiode PD according to an exposure time.

Specifically, the row select circuit may set the voltage of the gate of the transfer transistor TX to be lower than VDD during a first period so that charges are accumulated in the photodiode PD to the first maximum quantity of charge (unsaturation). The row select circuit may set the voltage of the gate of the transfer transistor TX to VDD during a second period so that charges are accumulated in the photodiode PD to the second maximum quantity of charge (saturation).

Figure 5:
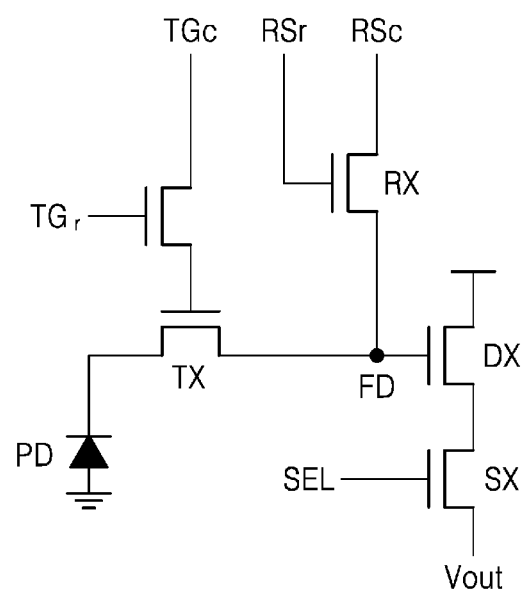
FIG. 5 is a diagram showing a pixel according to an example embodiment.

FIG. 5 is a diagram showing a pixel according to an example embodiment.

Pixels of the integrated image sensor according to an example embodiment may have a 5T APS structure.

In an example embodiment, a transfer control signal TGr, a reset signal RSr, and the selection signal SEL may be output from a row selector circuit. Also, a transfer control signal TGc and a reset signal RSc may be output from a column selector circuit. Pixels may be activated based on output signals of the row selector circuit and the column selector circuit.

The transfer transistor TX may transfer charge of the photodiode PD to the floating diffusion FD node in response to the transfer control signals TGr and TGc. The reset transistor RX may reset the floating diffusion FD node in response to the reset signals RSr and RSc.

It is possible to control pixels in units of pixels by the row selector circuit and the column selector circuit, thereby selectively controlling pixels corresponding to various types of sub regions.

Figure 6:
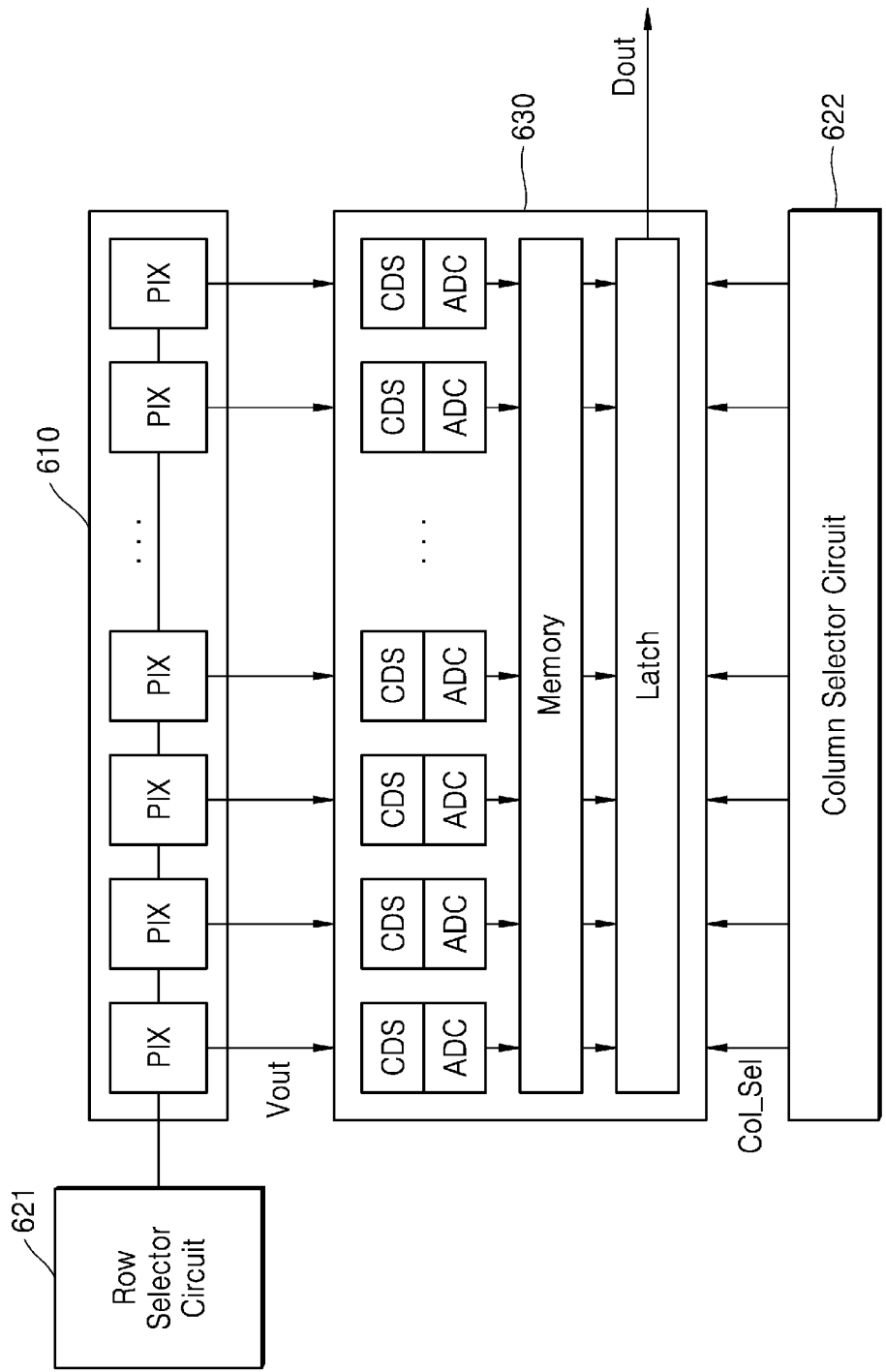
FIG. 6 is a diagram showing a method of processing output signals of pixels according to an example embodiment.

FIG. 6 is a diagram showing a method of processing output signals of pixels 620 according to an example embodiment.

The pixels 610 of a row selected by a row selector circuit 621 may be activated. The pixels 610 may output a voltage corresponding to light as an output signal Vout. The output signal Vout of the pixels 610 may be transmitted to an analog signal processing circuit 630.

The analog signal processing circuit 630 may be configured to read out image data Dout by processing the output signal Vout.

The analog signal processing circuit 630 may be configured to adjust a conversion gain based on a control signal and/or a sub region. The conversion gain may represent a ratio of a digital number output by an analog to digital converter (ADC) to the number of photons captured by a pixel. For example, when the number of photons is 10 and the digital number is 100, then the conversion gain is 10. The analog signal processing circuit 630 may adjust the conversion gain by adjusting a gain of the ADC based on the control signal and/or the sub region.

The column selector circuit 622 may output a column selection signal for selecting columns of pixels corresponding to the sub region or all columns of a pixel array, based on a control signal received from the processor 340.

The analog signal processing circuit 630 may read out sub image data at a first frame rate and read out entire image data at a second frame rate based on a column selection signal Col_Sel. Alternatively, the analog signal processing circuit 630 may read out first sub image data at the first frame rate and read out second sub image data at the second frame rate based on the column selection signal Col_Sel. The image data Dout output from the analog signal processing circuit 630 may be transmitted to a processor and/or a memory.

In addition, correlated double sampling (CDS) circuit and ADC of the analog signal processing circuit 630 may be configured to double sample and convert output signals of pixels corresponding to the sub region or output signals of pixels of entire columns based on the column selection signal Col_Sel. However, when the CDS circuit performs double sampling in parallel, there may be no difference between the time required to double sample output signals of the pixels corresponding to the sub region and the time required to double sample output signals of the pixels of all columns. Accordingly, the CDS circuit may be configured to double sample the output signals of the pixels of all columns, regardless of the column selection signal Col_Sel. The ADC may be configured in the same manner as the CDS circuit.

The analog signal processing circuit 630 may adjust a conversion gain corresponding to the sub region based on the column selection signal Col_Sel, and may not adjust a conversion gain corresponding to the remaining region. Alternatively, the analog signal processing circuit 630 may differently adjust a conversion gain corresponding to a first sub region and a conversion gain corresponding to a second sub region based on the column selection signal Col_Sel.

A memory and a latch of the analog signal processing circuit 630 may be configured to read and latch output signals of pixels corresponding to a digitized sub region or output signals of pixels of all digitized columns based on the column selection signal Col_Sel. For example, the analog signal processing circuit 630 may include a plurality of memories, and image data read from memories selected by the column selection signal Col_Sel may be latched and transmitted to a processor. For example, the memory of the analog signal processing circuit 630 may be static random access memory (SRAM), but is not limited thereto.

In FIG. 6, the analog signal processing circuit 630 includes the CDS circuit, the ADC, the memory, and the latch, but is not limited thereto. For example, the analog signal processing circuit 630 may further include a CDS circuit electrically connected to an output terminal of the ADC, or may include a programmable gain amplifier (PGA). For another example, the analog signal processing circuit 630 may be configured to include CDS circuits connected in parallel and ADCs connected in series.

Figure 7:
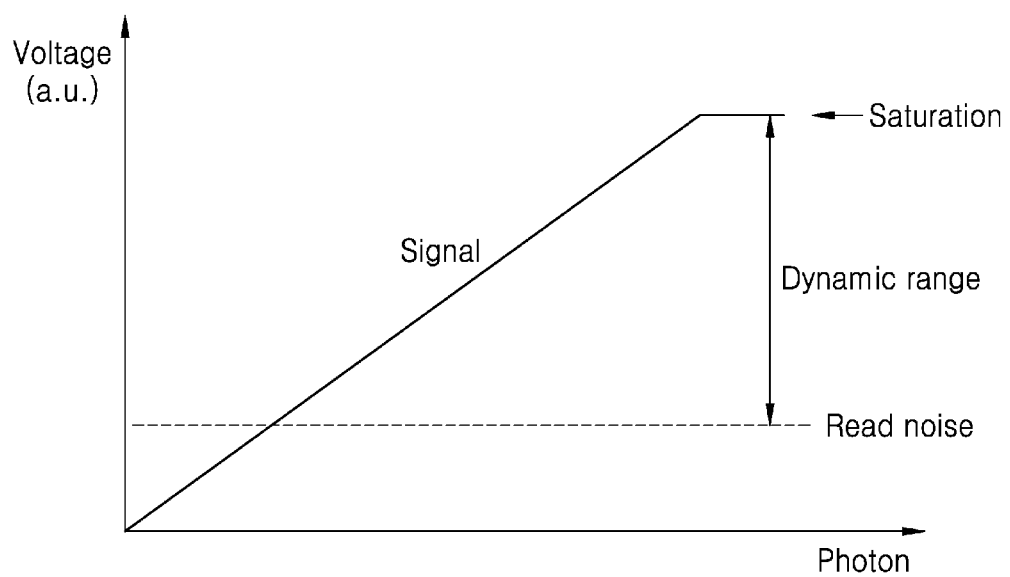
FIG. 7 is a diagram showing a dynamic range according to an example embodiment.

FIG. 7 is a diagram showing a dynamic range according to an example embodiment.

FIG. 7 is a graph showing the intensity (the number of photons) of light received by a pixel on the x axis and an output voltage of the pixel on the y axis.

The dynamic range represents a ratio of the smallest detectable signal to the largest recordable signal by an integrated image sensor. Specifically, the dynamic range represents a ratio of the smallest detectable illumination level and the largest recordable illumination level by the integrated image sensor. The dynamic range of the integrated image sensor may be determined by read noise and a maximum quantity of charge of a pixel.

The dynamic range of the integrated image sensor corresponds to a dynamic range of image data. The dynamic range of the image data may be determined by upper and lower limits of brightness. Signals smaller than the read noise may correspond to a region having a brightness lower than the lower limit in the image data, and signals greater than saturation may correspond to a region having a brightness higher than the upper limit in the image data.

Figure 8:
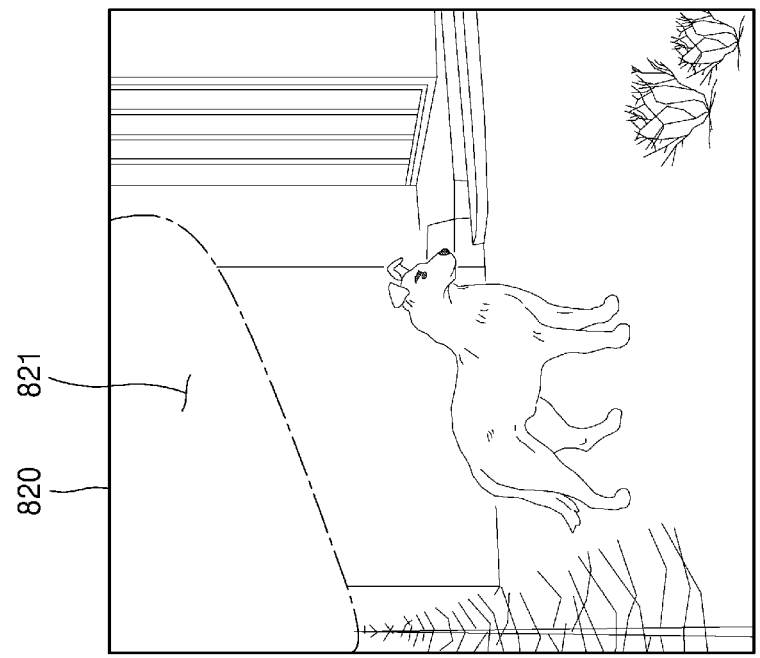
FIG. 8 is a diagram illustrating a method of determining a sub region and generating a control signal according to an example embodiment.
Figure 8:
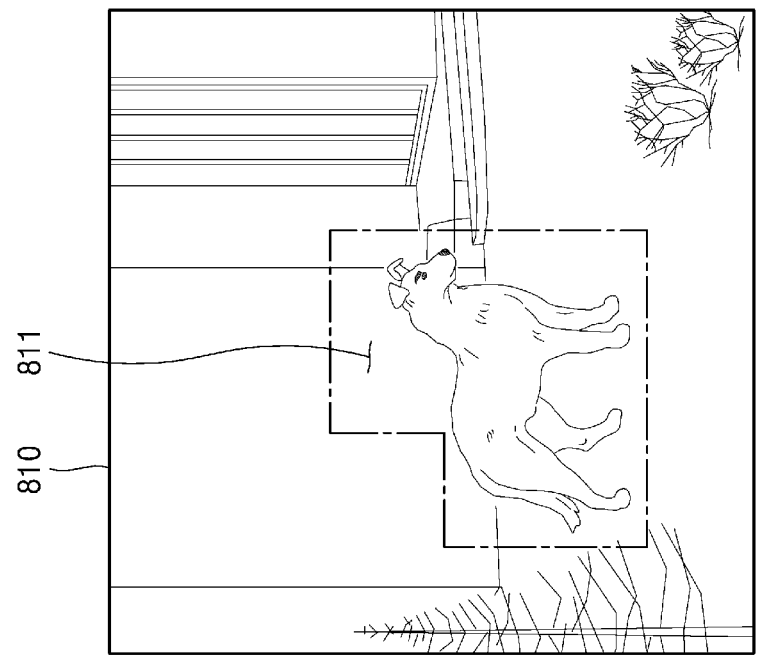

FIG. 8 is a diagram illustrating a method of determining sub regions 811 and 821 and generating a control signal according to an example embodiment.

A processor may determine the sub region based on a motion or an object of image data. The processor may detect the motion or the object in the image data 810 based on digital image processing, and determine the sub region 811 from a region in which the motion occurs or the object is located. When the motion occurs in a plurality of regions or there are a plurality of objects, the processor may determine a plurality of sub regions.

The processor may detect the motion or the object of the image data based on digital image processing. Algorithms such as machine learning, image clustering, and kernel based object detection may be used for digital image processing. In addition, it is obvious to those of ordinary skill in the art that various algorithms may be used for motion or object detection. For example, the processor may detect the object by recognizing the object from the image data based on a neural network.

The processor may generate a control signal for adjusting an exposure time, a conversion gain, a dynamic range, a frame rate, and the like, in correspondence to the sub region based on the motion or the object. For example, the processor may generate a control signal for adjusting a frame rate such that the sub region is captured at a high speed and the remaining region is captured at a normal speed.

Also, the processor may determine the sub region based on the dynamic range of the image data. Digital image processing may be used to analyze the dynamic range of the image data. The processor may determine a region of image data 820 beyond the dynamic range as a sub region 821. For example, the processor may determine a region in the image data 820 having brightness lower than the lower limit or higher than the upper limit in the image data as the sub region 821. When there are a plurality of regions out of the dynamic range, the processor may determine a plurality of sub regions.

The processor may output a control signal for adjusting an exposure time, the quantity of charge according to an exposure time of a pixel, a conversion gain, etc., in correspondence to the sub region based on the dynamic range. For example, the processor may output the control signal for lowering an exposure time and a conversion gain in correspondence to a sub region having brightness exceeding the upper limit.

In addition, the processor may determine a sub region based on the color of image data. Digital image processing may be used for color analysis of the image data. Specifically, the processor may determine the sub region based on hue, value, and/or chroma of the image data. For example, the processor may determine a region in which green is to be enhanced as the sub region, or a region in which chroma is to be adjusted as the sub region.

The processor may output a control signal for binning, white balance, or color enhancement, etc., in correspondence to a color based sub region.

Also, the processor may determine the sub region based on noise of the image data. Digital image processing may be used to analyze noise of image data. For example, the processor may determine a region having a signal to noise ratio (SNR) lower than a reference value as the sub region.

The processor may output a control signal for adjusting an exposure time, a conversion gain, a dynamic range, or a frame rate so as to increase the SNR.

Figure 9:
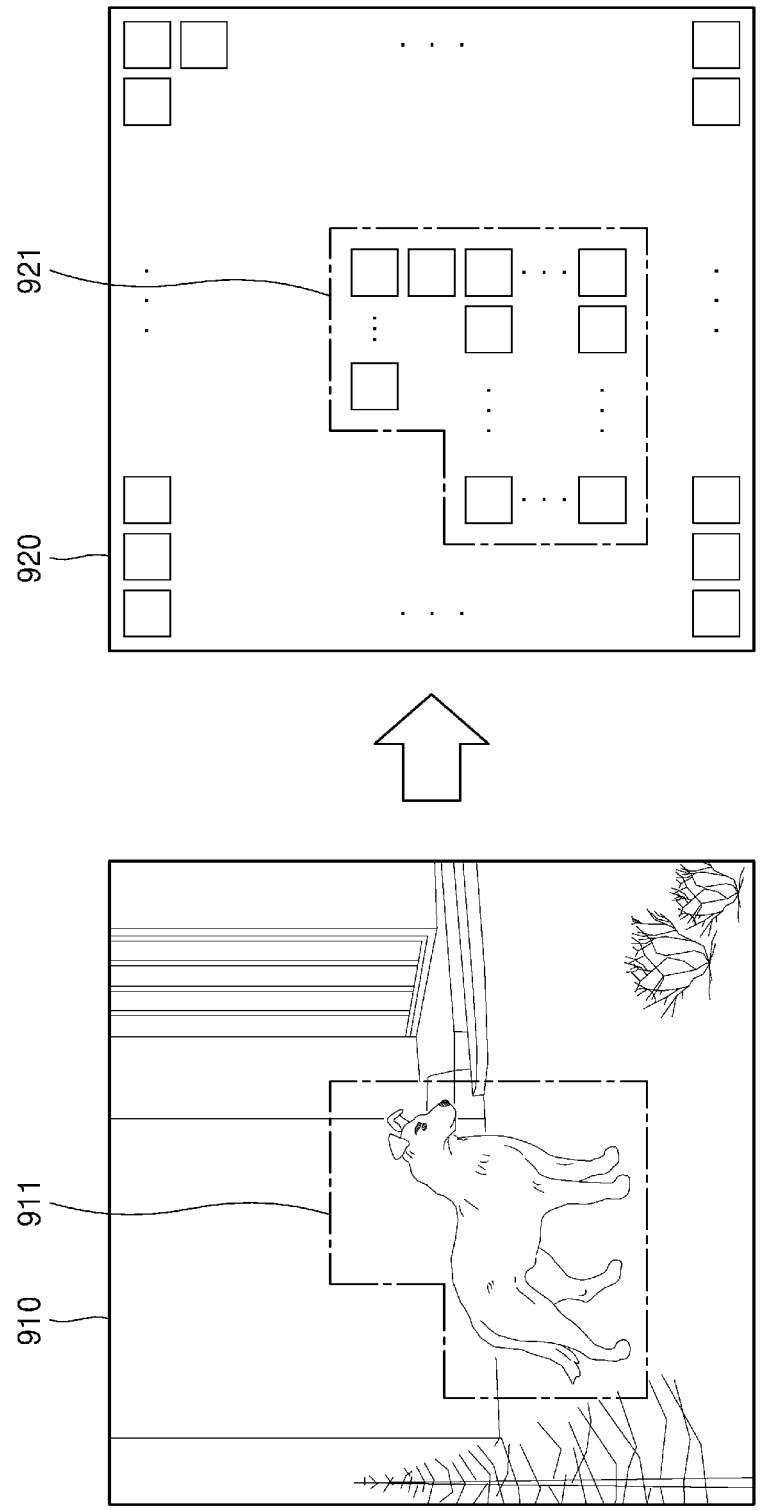
FIG. 9 is a diagram showing determining a sub region of a pixel array based on a sub region of image data according to an example embodiment.

FIG. 9 is a diagram showing determining a sub region 921 of a pixel array 920 based on a sub region 911 of image data 910 according to an example embodiment.

A processor may determine the sub region 911 of the image data 910 based on digital image processing. Although one sub region 911 is shown in FIG. 9, it is obvious to those of ordinary skill in the art that a plurality of sub regions may be selected.

The processor may determine the sub region 921 of the pixel array by obtaining addresses of pixels of the pixel array 920 corresponding to the sub region 911 of the image data.

An analog circuit may activate the pixels of the sub region 921 based on the control signal and may process output signals of the pixels of the sub region 921.

Figure 10:
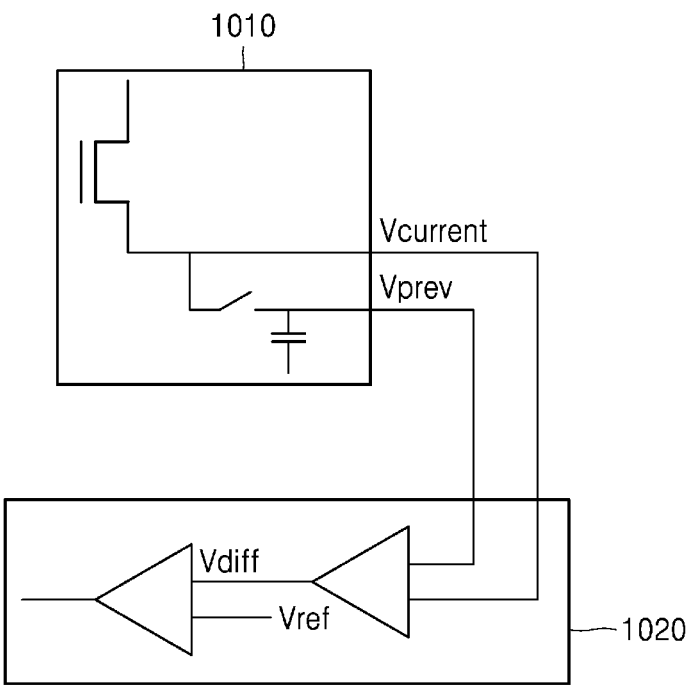
FIG. 10 is a diagram showing motion detection between image frames based on analog signal processing according to an example embodiment.

FIG. 10 is a diagram showing motion detection between image frames based on analog signal processing according to an example embodiment.

An integrated image sensor according to an example embodiment may be configured to determine a sub region of a pixel array based on analog signal processing. Specifically, a motion detecting circuit 1020 may detect motion between image frames based on a received output signal of the pixel, and a processor may determine the sub region of the pixel array based on the detected motion.

For convenience of description, the motion detecting circuit 1020 electrically connected to one pixel 1010 is illustrated in FIG. 10. The motion detecting circuit 1020 may be electrically connected to a plurality of pixels of the pixel array.

The motion detecting circuit 1020 may be configured to detect the motion between a current image frame and a previous image frame based on an output signal of the pixel array corresponding to the current image frame and an output signal of the pixel array corresponding to the previous image frame. In this case, the output signal of the pixel array may be a voltage.

In an example embodiment, the pixel 1010 may be configured to store the output signal corresponding to the previous image frame. For example, the pixel 1010 may include an analog memory such as a capacitor storing the output signal corresponding to the previous image frame. For another example, the pixel 1010 may be configured to store the output signal corresponding to the previous image frame without additional analog memory. For this, the pixel 1010 may have a dual well or a dual pixel structure.

The motion detecting circuit 1020 may be configured to calculate a difference between an output signal Vcurrent corresponding to the current image frame and an output signal Vprev corresponding to the previous image frame, and compare the calculated difference Vdiff with a reference value Vref. For example, the motion detecting circuit 1020 may be configured to compare the calculated difference Vdiff with a positive reference value and a negative reference value.

The motion detecting circuit 1020 may output a motion detection signal based on a result of comparing the difference Vdiff and the reference value Vref. The motion detection signal may be a 1 bit signal. For example, the motion detection signal may be a 1 bit signal having a value of 0 when the difference Vdiff is less than the reference value Vref and a 1 bit signal having a value of 1 when the difference Vdiff is greater than the reference value Vref. For another example, the motion detection signal may be a 1 bit signal having a value of 0 when the difference Vdiff is less than the positive reference value and greater than the negative reference value, and a 1 bit signal having a value of 1 when the difference Vdiff is greater than the positive reference value and less than the negative reference value.

The motion detecting circuit 1020 may transmit the motion detection signal to a processor. The processor may determine the sub region of the pixel array based on the motion detection signal. In addition, the processor may generate a control signal for adjusting an exposure time, a conversion gain, a dynamic range, or a frame rate, etc., corresponding to a motion based sub region.

Because the motion detecting circuit 1020 is configured to detect the motion between image frames from the output signal of the pixel array, the motion may be detected at high speed.

Figure 11:
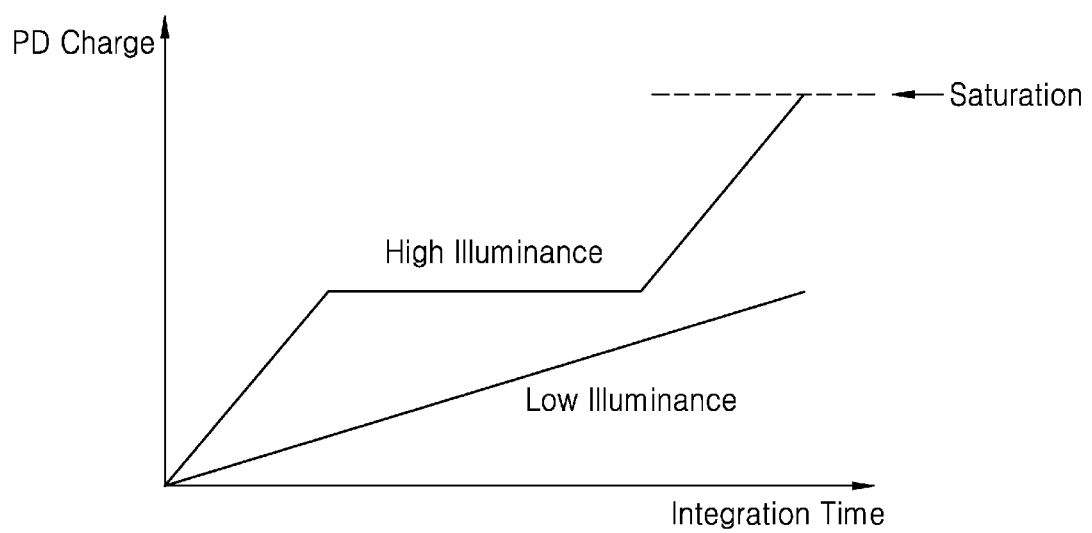
FIG. 11 is a diagram showing a method of adjusting the quantity of charge according to an integration time of a pixel based on a control signal according to an example embodiment.

FIG. 11 is a diagram showing a method of adjusting the quantity of charge according to an integration time of a pixel based on a control signal according to an example embodiment.

A processor may generate the control signal for high dynamic range imaging (HDR) when at least a partial region of image data is beyond a dynamic range. An analog circuit may adjust the quantity of charge according to the integration time of the pixel based on the control signal fed back from the processor.

The analog circuit may control the quantity of charge of the pixel to linearly increase according to the integration time based on the control signal. For example, a row select circuit sets the voltage of a gate of a transfer transistor of the pixel to VDD, and thus the quantity of charge in the pixel may linearly increase.

Alternatively, the analog circuit may control the quantity of charge of the pixel to non-linearly increase according to the integration time based on the control signal. For example, the row selector circuit sets a gate voltage of the transfer transistor to be lower than VDD during an arbitrary first period, and sets the gate voltage of the transfer transistor to VDD during an arbitrary second period, and thus the quantity of charge in the pixel may non-linearly increase. During the first period, because the maximum quantity of charge of a photodiode is reduced due to the gate voltage set to be lower than VDD, the quantity of charge of the pixel may remain constant in unsaturation. During the second period, because the maximum quantity of charge of the photodiode increases due to the gate voltage set to VDD, the quantity of charge of the pixel may increase to saturation.

In a low illuminance, the pixels may not saturate even though charges accumulate during a long integration time. However, in a high illuminance, the pixel may be saturated in a short integration time. In an integrated image sensor according to an example embodiment, by adjusting a gate voltage of the transfer transistor, even though charges are accumulated for a predetermined exposure time at high illuminance, the pixel may not be saturated. Accordingly, the dynamic range of image data may be improved.

Figure 12:
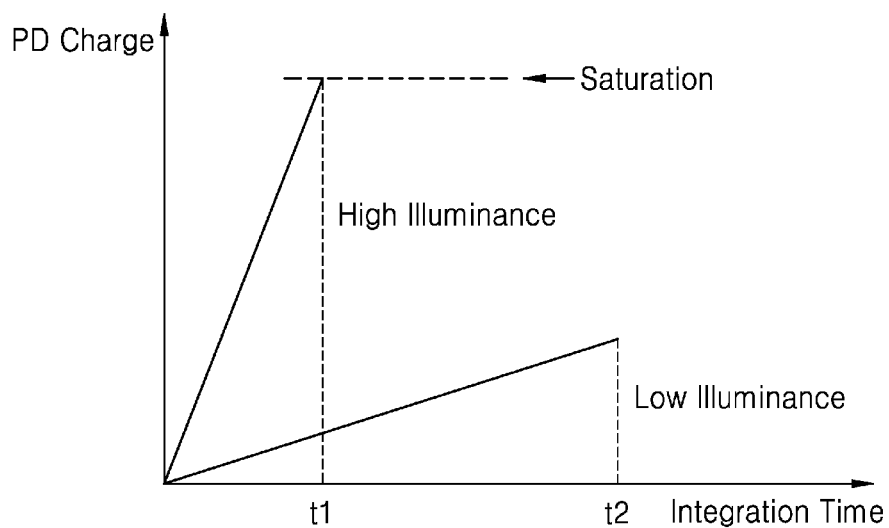
FIG. 12 is a diagram showing a method of performing dual sampling based on a control signal according to an example embodiment.

FIG. 12 is a diagram showing a method of performing dual sampling based on a control signal according to an example embodiment.

A processor may generate a control signal for HDR when at least a partial region of image data is beyond a dynamic range. An analog circuit may perform dual sampling based on the control signal fed back from the processor.

The processor may output a control signal for adjusting an integration time to a first integration time t1 and a second integration time t2 when at least a partial region of the image data is beyond the dynamic range.

The analog circuit may read out image data having different integration times based on the control signal. For example, a row selector circuit may control a pixel array such that charges are accumulated in the photodiode for the first integration time t1 or the second integration time t2.

The integration time is adjusted based on the control signal, and thus image data captured in the short integration time in a high illuminance and image data captured in the long integration time in a low illuminance may be obtained.

Two image data having different integration times may be stored in a memory. The processor may implement HDR by combining the image data captured in the high illuminance and the image data captured in the low illuminance.

Alternatively, the processor may output a control signal for capturing a first sub region beyond the upper limit of the dynamic range at the first integration time t1 and a second sub region beyond the lower limit of the dynamic range at the second integration time t2.

The analog circuit may read out image data having regions of different integration times based on the control signal. The integration time is adjusted based on the control signal, and thus image data having a first region captured at a short integration time in the high illuminance and a second region captured at a long integration time in the low illuminance may be obtained.

The image data having the adjusted integration time may be stored in a memory. The processor may image match the first region of the image data captured in the high illuminance with the second region of the image data captured in the low illuminance, thereby generating the entire image data and implementing HDR.

Figure 13:
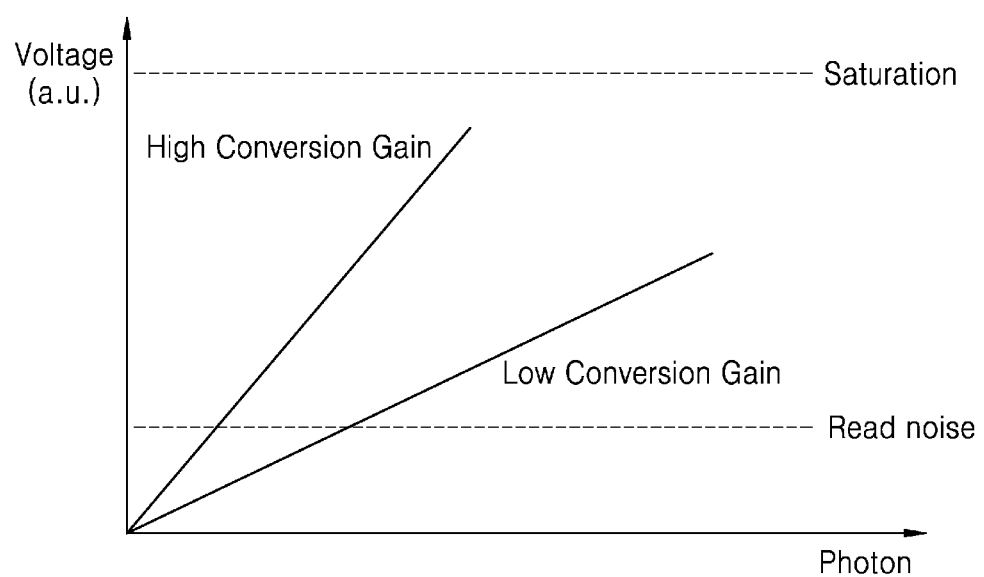
FIG. 13 is a diagram showing a method of adjusting a conversion gain based on a control signal according to an example embodiment.

FIG. 13 is a diagram showing a method of adjusting a conversion gain based on a control signal according to an example embodiment.

A processor may output a control signal for adjusting the conversion gain. The processor may determine to adjust the conversion gain when at least a partial region of image data is beyond a dynamic range, has a low SNR, etc.

The higher the conversion gain, the faster the saturation state is reached, and the lower the conversion gain, the greater the effect of noise. Accordingly, the processor may output the control signal for adjusting the conversion gain so as to improve the dynamic range and SNR of the image data.

For example, when at least a partial region of the image data is beyond the dynamic range, the processor may output the control signal for adjusting the conversion gain. When at least a partial region of the image data exceeds the upper limit of the dynamic range, the control signal for reducing the conversion gain may be output, and when at least a partial region of the image data is less than the lower limit of the dynamic range, the control signal for increasing the conversion gain may be output. An analog circuit may adjust the conversion gain based on the control signal. For example, the conversion gain may be adjusted by adjusting the gain of a ADC.

Also, when at least a partial region of the image data has a low SNR, the processor may output the control signal for increasing the conversion gain. The analog circuit may increase the SNR of the image data by increasing the conversion gain based on the control signal.

Figure 14:
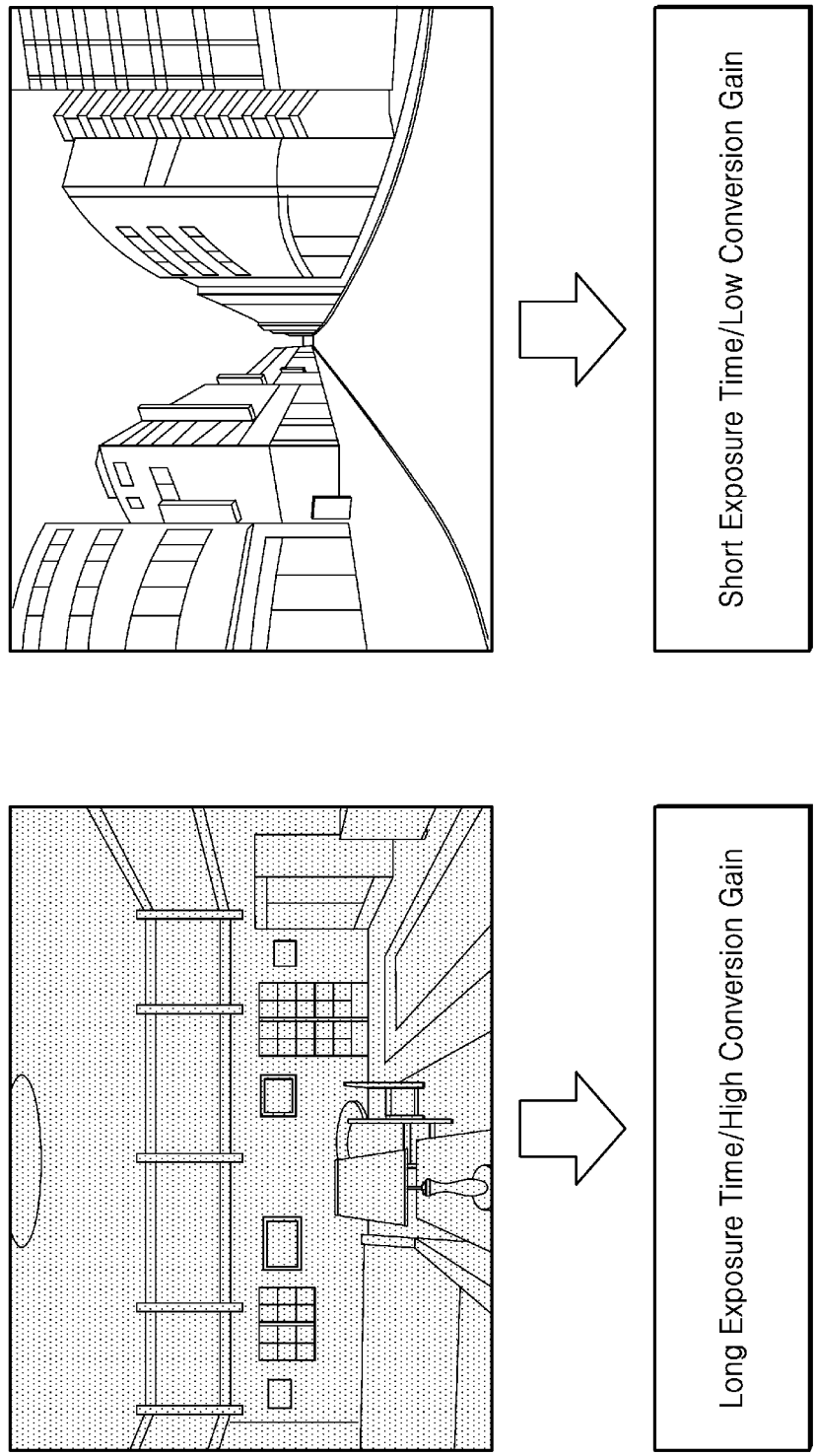
FIG. 14 is a diagram showing a method of generating a control signal based on a place where image data is captured, according to an example embodiment.

FIG. 14 is a diagram showing a method of generating a control signal based on a place where image data is captured, according to an example embodiment.

A processor may analyze the place where the image data is captured. Various algorithms such as machine learning, object detection, and image clustering may be used for analyzing the place. Through analysis, the processor may obtain information about the place such as indoor/outdoor, brightness of the place, and a location of a light source.

The processor may generate a control signal for adjusting an exposure time, a conversion gain, the quantity of charge according to the exposure time of a pixel, a dynamic range, etc., based on the place where the image data is captured.

For example, if it is analyzed that the place where the image data is captured is a dark room, the processor may generate a control signal for increasing the exposure time and increasing the conversion gain. For another example, when it is analyzed that the place where the image data is captured is bright outdoors, the processor may generate the control signal for reducing the exposure time and reducing the conversion gain. As another example, when the processor analyzes that the light source is located on an upper side of the place where the image data is captured, the processor may generate the control signal for reducing the exposure time of the upper region of the image data and increasing the exposure time of the lower region of the image data.

Figure 15:
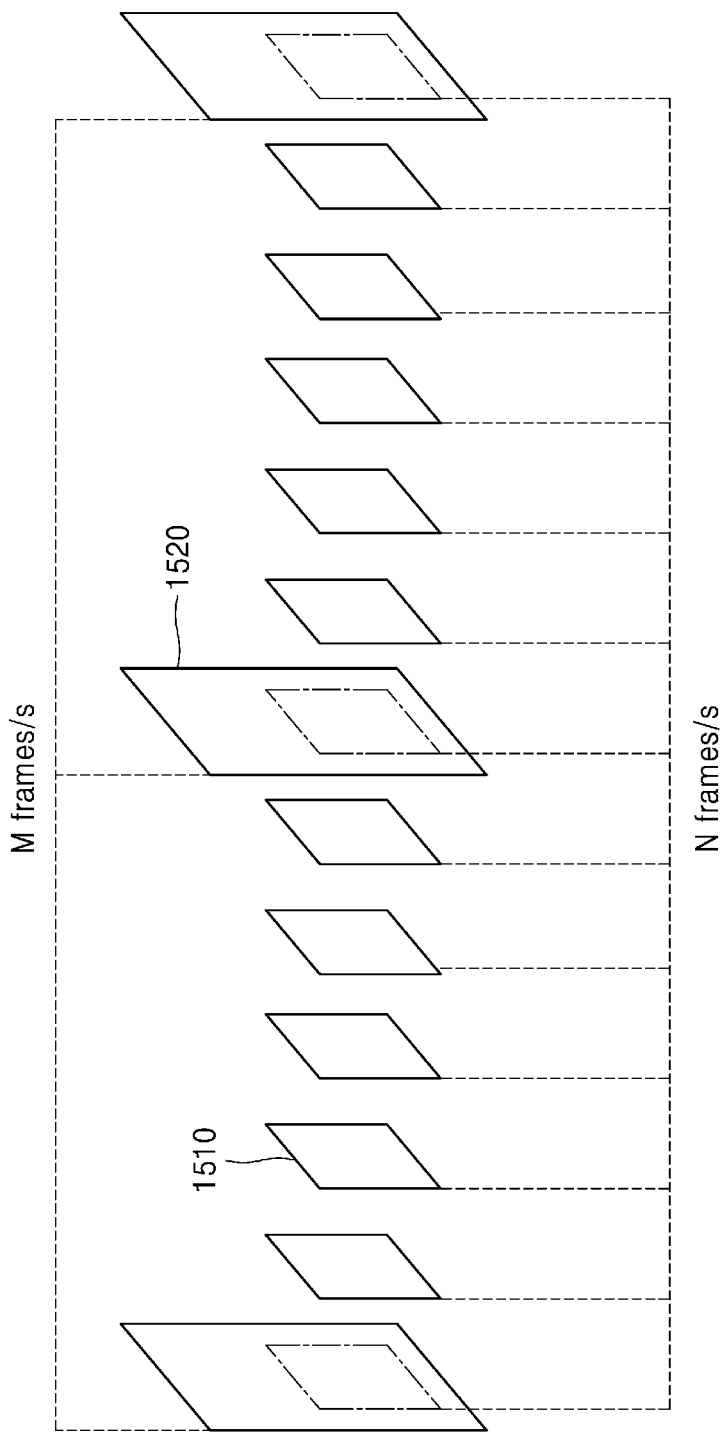
FIG. 15 is a diagram showing a method of outputting image data at different frame rates based on a control signal according to an example embodiment.

FIG. 15 is a diagram showing a method of reading out image data at different frame rates based on a control signal according to an example embodiment.

A processor may generate a control signal for frame rate adjustment when capturing a sub region at a frame rate different from that of the remaining region.

An analog circuit may receive feedback of the sub region and the control signal from the processor. The analog circuit may perform image readout based on pixels corresponding to the sub region and image readout based on pixels not corresponding to the sub region at different frame rates according to the control signal. Accordingly, the analog circuit may read out sub image data 1510 and entire image data 1520 at different frame rates (e.g., N frames per second, and M frames per second, as shown in FIG. 15). For example, the analog circuit may read out the sub image data 1510 at a high frame rate of 960 frames/s and read out the entire image data 1520 at a normal frame rate of 30 frames/s.

Figure 16:
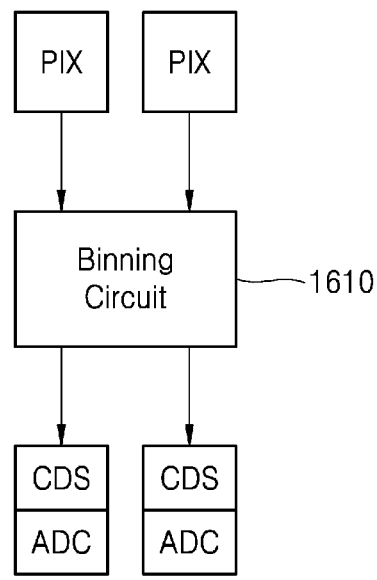
FIG. 16 is a diagram showing a method of performing pixel binning based on a control signal according to an example embodiment.

FIG. 16 is a diagram showing a method of performing pixel binning based on a control signal according to an example embodiment.

A processor may output a control signal for performing pixel binning when at least part of image data is beyond a dynamic range or an SNR is lower than a reference value.

The analog circuit may include a binning circuit 1610 for pixel binning.

The binning circuit 1610 may selectively perform pixel binning in response to the control signal. Also, the binning circuit 1610 may perform pixel binning on pixels of a sub region and may not perform pixel binning on pixels of the remaining region according to the control signal. For example, when the binning circuit 1610 performs pixel binning on two pixels, the binning circuit 1610 may merge output signals of the two pixels and transfer the merged output signal to one CDS circuit or ADC. Alternatively, when the binning circuit 1610 does not perform pixel binning, the binning circuit 1610 may transmit the output signal of each pixel to each CDS circuit or ADC.

Figure 17:
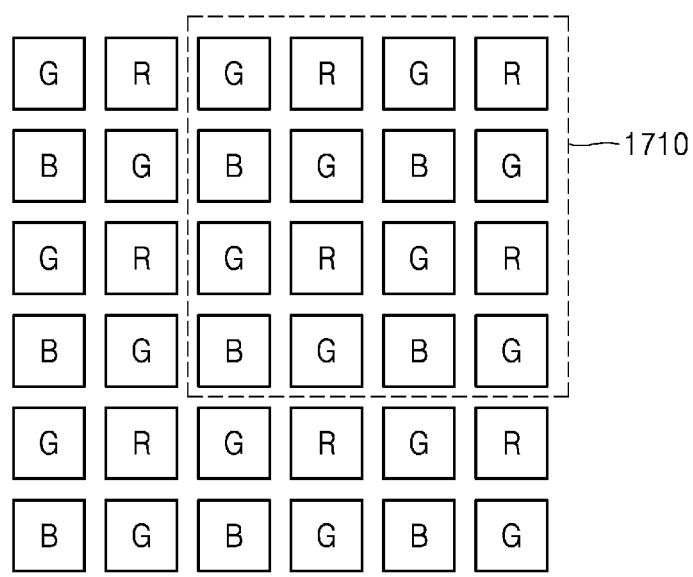
FIG. 17 is a diagram illustrating a method of performing white balancing and color enhancement based on a control signal according to an example embodiment.

FIG. 17 is a diagram illustrating a method of performing white balancing and color enhancement based on a control signal according to an example embodiment.

A processor may determine a sub region requiring white balancing or color enhancement based on the color of image data. The processor may generate a control signal for adjusting an exposure time or a conversion gain with respect to the sub region.

An analog circuit may perform white balancing or color enhancement of pixels included in a sub region 1710 of a pixel array according to the control signal. For example, the analog circuit may perform color enhancement by increasing a conversion gain corresponding to green pixels in the sub region 1710. For another example, the analog circuit may perform white balancing by applying different conversion gains to the pixels of the sub region 1710 for each color.

Figure 18:
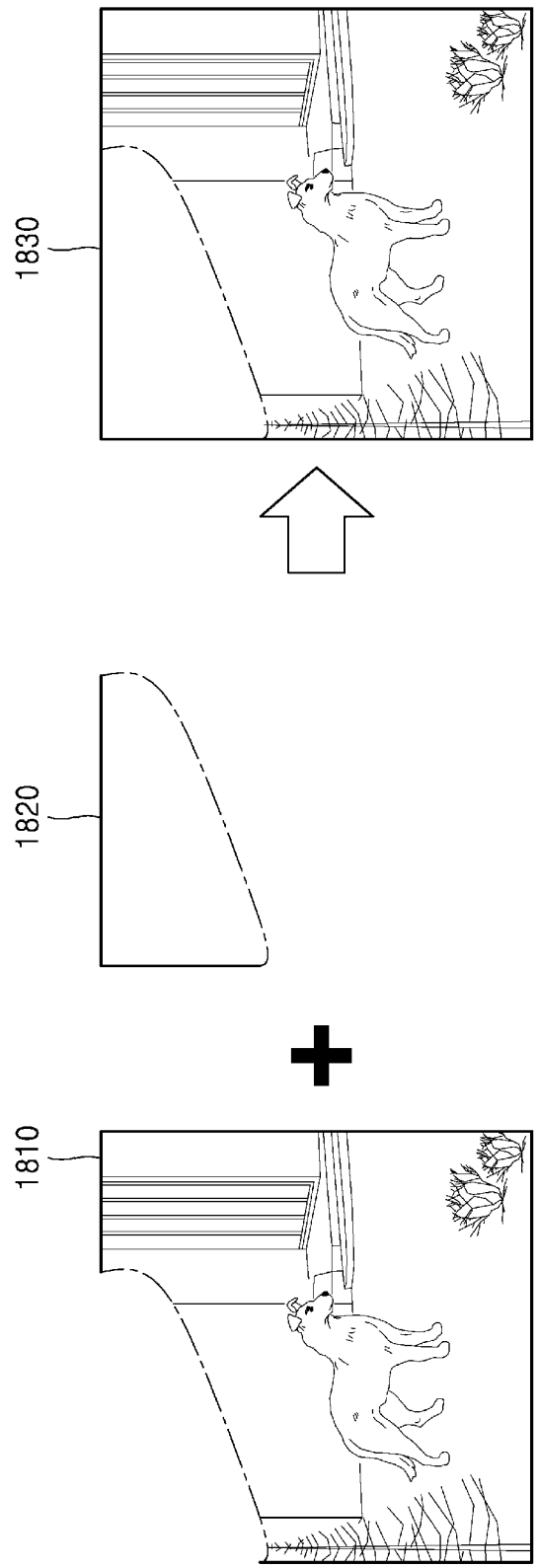
FIG. 18 is a diagram showing a method of generating entire image data according to an example embodiment.

FIG. 18 is a diagram showing a method of generating entire image data 1830 according to an example embodiment.

A processor may generate sub image data 1820 based on output signals of pixels in a sub region. Also, the processor may generate remaining image data 1810 based on output signals of pixels in the remaining region.

Alternatively, the processor may generate the first sub image data 1810 based on output signals of pixels of a first sub region. Also, the processor may generate the second the sub image data 1820 based on output signals of pixels of a second sub region.

The processor may generate the entire image data 1830 by combining the sub image data 1820 and the remaining image data 1810. Alternatively, the processor may generate the entire image data 1830 by combining the first sub image data 1810 and the second sub image data 1820.

Because the sub image data 1820 and the remaining image data 1810 or the first sub image data 1810 and the second sub image data 1820 are based on different control signals, the sub image data 1820 and the remaining image data 1810 or the first sub image data 1810 and the second sub image data 1820 may not be continuous due to a difference in an exposure time, a conversion gain, a frame rate, etc. To this end, the processor may be configured to generate the entire image data 1830 based on image registration.

For example, the processor may perform image registration by correcting the remaining image data 1810 based on the sub image data 1820, or by correcting the sub image data 1820 based on the remaining image data 1810. For another example, the processor may perform image registration such that a boundary region between the sub image data 1820 and the remaining image data 1810 is continuous.

The processor may be configured to selectively output sub image data 1820, remaining image data 1810, and entire image data 1830. Also, the processor may be configured to selectively output the first sub image data 1810, the second sub image data 1820, and the entire image data 1830. When the processor outputs only sub image data, a process of generating entire image data may be omitted.

Figure 19:
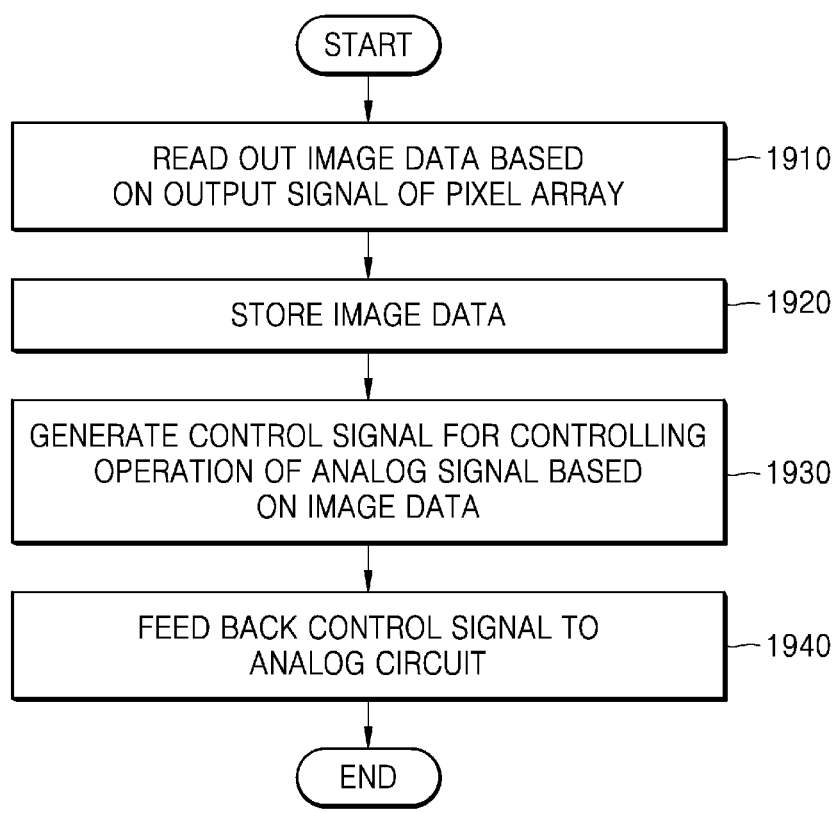
FIG. 19 is a flowchart showing a method of operating an integrated image sensor with internal feedback according to an example embodiment.

FIG. 19 is a flowchart showing a method of operating an integrated image sensor with internal feedback according to an example embodiment.

In operation 1910, an analog circuit may read out image data based on an output signal of a pixel array. The analog circuit may read out image data by controlling the operation of the pixel array and processing the output signal of the pixel array.

In operation 1920, a memory may store image data. The memory may store image data read out from the analog circuit, and may provide the image data to a processor according to a call from the processor.

In operation 1930, the processor may generate a control signal for controlling the operation of the analog circuit based on the image data. The processor may analyze the image data based on digital image processing and determine whether parameter adjustment for image capture is necessary. The processor may generate the control signal for parameter adjustment. For example, the processor may generate the control signal for adjusting an exposure time, a conversion gain, a dynamic range, and the quantity of charge according to an exposure time of a pixel.

In operation 1940, the processor may feed back the control signal to the analog circuit. The analog circuitry may control the operation of the pixel array based on the control signal and process the output signal of the pixel array.

The processor feeds back the control signal to the analog circuit based on the image data, and thus an image may be adaptively captured and an image of high quality may be provided.

Figure 20:
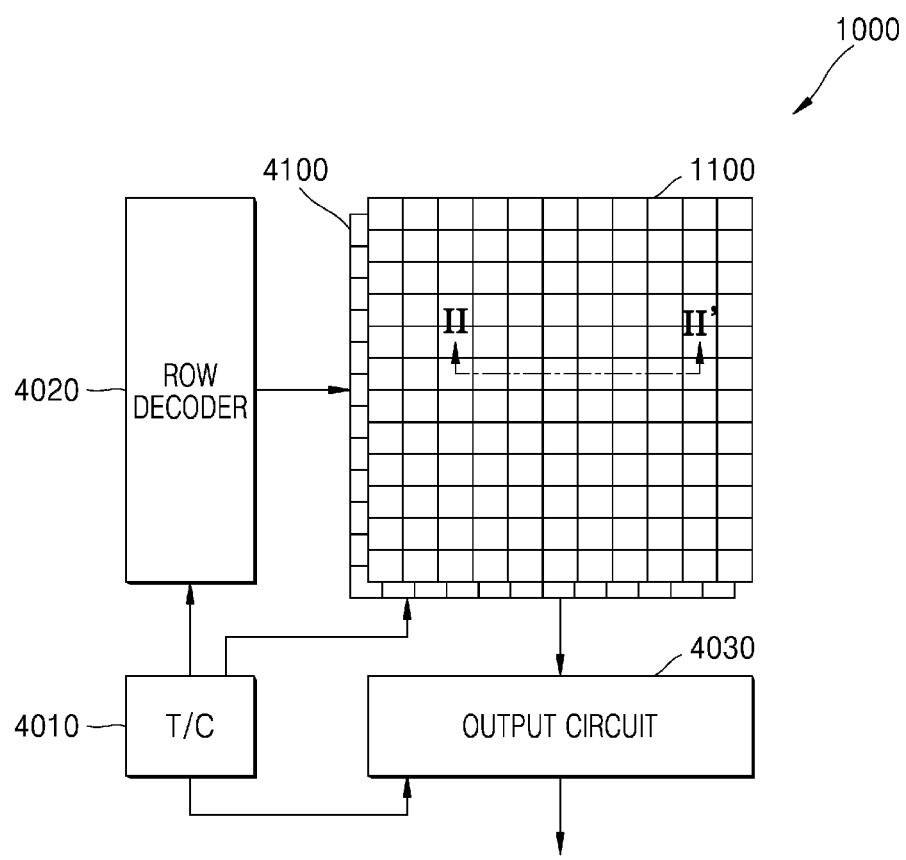
FIG. 20 is a schematic block diagram of an image sensor according to an example embodiment.

FIG. 20 is a schematic block diagram of an image sensor 1000 according to an example embodiment.

The image sensor 1000 of FIG. 20 may be an example of an integrated image sensor having an internal feedback. The image sensor 1000 is not limited by FIG. 20 and the description with reference to FIG. 20. It is apparent to those skilled in the art that the image sensor 1000 may be implemented in a modified form within the range not departing from the essential feature of the image sensor 1000. For example, the image sensor 1000 may be implemented not to include a color/spectral filter 1100 or may be implemented to further include a microlens array or a polarization filter. As another example, the image sensor 1000 may be configured such that each pixel includes an ADC so that all pixels may capture an image at once.

Referring to FIG. 20, the image sensor 1000 may include a color/spectral filter 1100, a pixel array 4100, a timing controller 4010, a row decoder 4020, and an output circuit 4030. The image sensor 1000 may include a charge coupled device (CCD) image sensor or a complementary metal oxide semiconductor (CMOS) image sensor, but is not limited thereto.

The color/spectral filter 1100 transmits or blocks light of different wavelength regions and includes a plurality of unit filters arranged in two dimensions. The pixel array 4100 may include a plurality of pixels that detect light of different wavelengths transmitted through the plurality of unit filters. Specifically, the pixel array 4100 may include two-dimensionally arranged pixels along a plurality of rows and columns. The row decoder 4020 may select one of the rows of the pixel array 4100 in response to a row address signal output from the timing controller 4010. The output circuit 4030 may output a photo-sensing signal from the plurality of pixels arranged along the selected row in units of columns. To this end, the output circuit 4030 may include a column decoder (e.g., a column selector circuit 322) and an analog-to-digital converter (ADC). For example, the output circuit 4030 may include a plurality of ADCs respectively disposed for each column between the column decoder and the pixel array 4100, or one ADC disposed at an output terminal of the column decoder. The timing controller 4010, the row decoder 4020, and the output circuit 4030 may be implemented as a single chip or as separate chips. A processor for processing an image signal output through the output circuit 4030 may be implemented as a single chip together with the timing controller 4010, the row decoder 4020, and the output circuit 4030. The pixel array 4100 includes a plurality of pixels sensing light of different wavelengths. In this regard, an arrangement of the pixels may be implemented in various ways.

The image sensor 1000 may be employed in various high-performance optical devices or high-performance electronic devices. Such electronic devices may include, for example, smart phones, mobile phones, cell phones, personal digital assistants (PDA), laptops, PCs, various portable devices, home appliances, security cameras, medical cameras, automobiles, Internet of Things (IoT) devices or other mobile or non-mobile computing devices, but are not limited thereto.

In addition to the image sensor 1000, the electronic device may further include a processor controlling the image sensor 1000, for example, an application processor (AP). The electronic device may control a plurality of hardware or software components by driving an operating system or an application program through the processor, and may perform various data processing and operations. The processor may further include a graphic processing unit (GPU), a neural processing unit (NPU), and/or an image signal processor. When the processor includes the image signal processor, an image obtained by the image sensor 1000 may be processed, stored, and/or output by using the processor.

Figure 21:
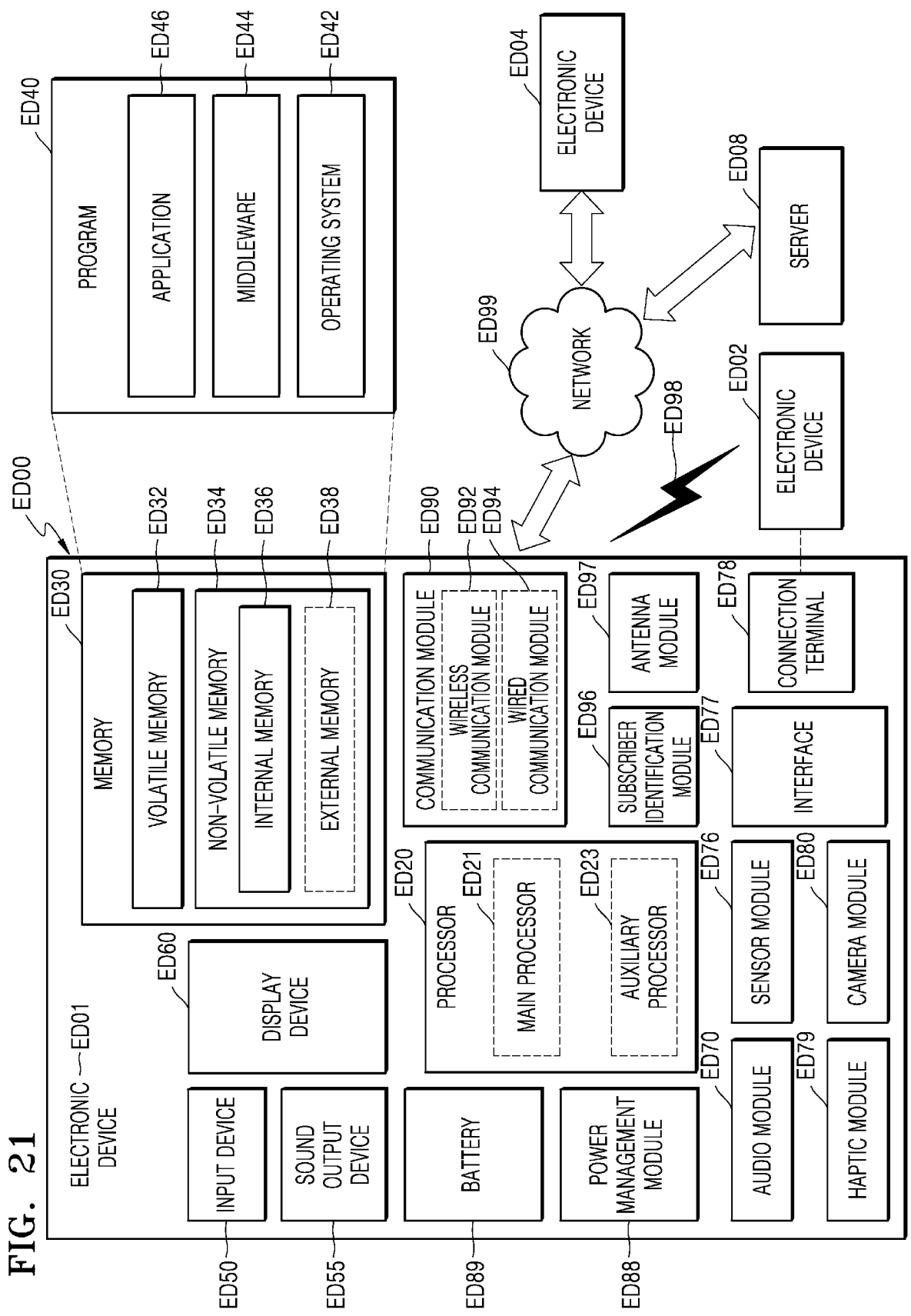
FIG. 21 is a block diagram illustrating an example of an electronic device including an image sensor.

FIG. 21 is a block diagram illustrating an example of an electronic device ED01 including the image sensor 1000.

Referring to FIG. 21, in a network environment ED00, the electronic device ED01 may communicate with another electronic device ED02 through a first network ED98 (such as a short-range wireless communication network) or may communicate with another electronic device ED04 and/or a server ED08 through a second network ED99 (a telecommunication network, etc.) The electronic device ED01 may communicate with the electronic device ED04 through the server ED08. The electronic device ED01 may include a processor ED20, a memory ED30, an input device ED50, a sound output device ED55, a display device ED60, an audio module ED70, a sensor module ED76, an interface ED77, a haptic module ED79, a camera module ED80, a power management module ED88, a battery ED89, a communication module ED90, a subscriber identification module ED96, and/or an antenna module ED97. In the electronic device ED01, some (e.g., the display device ED60) of these components may be omitted or other components may be added. Some of these components may be implemented as one integrated circuit. For example, the sensor module ED76 (a fingerprint sensor, an iris sensor, an illuminance sensor, etc.) may be implemented by being embedded in the display device ED60 (a display, etc.)

The processor ED20 may control one or a plurality of other components (hardware, software components, etc.) of the electronic device ED01 connected to the processor ED20 by executing software (e.g., a program ED40), and perform various data processing or operations. As part of data processing or operations, the processor ED20 may load commands and/or data received from other components (a sensor module ED76, a communication module ED90, etc.) into a volatile memory ED32, process the commands and/or data stored in the volatile memory ED32, and store resulting data in a non-volatile memory ED34. The processor ED20 may include a main processor ED21 (a central processing unit, an application processor, etc.) and an auxiliary processor ED23 (a graphics processing unit, an image signal processor, a sensor hub processor, a communication processor, etc.) that may operate independently or together. The auxiliary processor ED23 may use less power than the main processor ED21 and perform a specialized function.

The auxiliary processor ED23 may control functions and/or states related to some (the display device ED60, the sensor module ED76, the communication module ED90, etc.) of components of the electronic device ED01, on behalf of the main processor ED21 while the main processor ED21 is in an inactive state (a sleep state) or together with the processor ED21 while the main processor ED21 is in an active state (an application execution state). The auxiliary processor ED23 (the image signal processor, the communication processor, etc.) may be implemented as a part of other functionally related components (the camera module ED80, the communication module ED90, etc.)

The memory ED30 may store various data required by components (the processor ED20, the sensor module ED76, etc.) of the electronic device ED01. The data may include, for example, input data and/or output data with respect to software (the program ED40) and commands related thereto. The memory ED30 may include the volatile memory ED32 and/or the nonvolatile memory ED34. The nonvolatile memory ED32 may include an internal memory ED36 fixedly mounted on the electronic device ED01 and a removable external memory ED38.

The program ED40 may be stored as software in the memory ED30 and may include an operating system ED42, middleware ED44, and/or an application ED46.

The input device ED50 may receive commands and/or data to be used by a component (e.g., the processor ED20) of the electronic device ED01 from outside (e.g., a user) the electronic device ED01. The input device ED50 may include a microphone, a mouse, a keyboard, and/or a digital pen (a stylus pen, etc.)

The sound output device ED55 may output a sound signal to the outside of the electronic device ED01. The sound output device ED55 may include a speaker and/or a receiver. The speaker may be used for general purposes such as multimedia playback or recording playback, and the receiver may be used to receive incoming calls. The receiver may be integrated as a part of the speaker or may be implemented as an independent separate device.

The display device ED60 may visually provide information to the outside of the electronic device ED01. The display device ED60 may include a display, a hologram device, or a projector and a control circuit for controlling the corresponding device. The display device ED60 may include a touch circuitry configured to sense a touch, and/or a sensor circuitry (a pressure sensor, etc.) configured to measure the intensity of force generated by the touch.

The audio module ED70 may convert sound into an electric signal or, conversely, convert the electric signal into sound. The audio module ED70 may obtain sound through the input device ED50 or output sound through the sound output device ED55 and/or a speaker and/or headphones of other electronic device (the electronic device ED02, etc.) directly or wirelessly connected to the electronic device ED01.

The sensor module ED76 may sense an operating state (power, temperature, etc.) of the electronic device ED01 or an external environmental state (a user state, etc.), and generate an electrical signal and/or a data value corresponding to the sensed state. The sensor module ED76 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface ED77 may support one or a plurality of designated protocols that may be used to directly or wirelessly connect the electronic device ED01 to another electronic device (e.g., the electronic device ED02). The interface ED77 may include a High Definition Multimedia Interface (HDMI), a Universal Serial Bus (USB) interface, an SD card interface, and/or an audio interface.

The connection terminal ED78 may include a connector through which the electronic device ED01 may be physically connected to another electronic device (e.g., the electronic device ED02). The connection terminal ED78 may include an HDMI connector, a USB connector, an SD card connector, and/or an audio connector (a headphone connector, etc.)

The haptic module ED79 may convert an electrical signal into a mechanical stimulus (vibration, movement, etc.) or an electrical stimulus that the user may perceive through tactile or kinesthetic sense. The haptic module ED79 may include a motor, a piezoelectric element, and/or an electrical stimulation device.

The camera module ED80 may capture still images and moving images. The camera module ED80 may include a lens assembly including one or a plurality of lenses, the image sensor 1000 of FIG. 1 or 20, image signal processors, and/or flashes. The lens assembly included in the camera module ED80 may collect light emitted from a subject, which is an image capturing object.

The power management module ED88 may manage power supplied to the electronic device ED01. The power management module ED88 may be implemented as a part of a power management integrated circuit (PMIC).

The battery ED89 may supply power to components of the electronic device ED01. The battery ED89 may include a non-rechargeable primary cell, a rechargeable secondary cell, and/or a fuel cell.

The communication module ED90 may establish a direct (wired) communication channel and/or wireless communication channel between the electronic device ED01 and other electronic devices (the electronic device ED02, the electronic device ED04, the server ED08, etc.) and perform communication through the established communication channel. The communication module ED90 may include one or a plurality of communication processors operating independently of the processor ED20 (the application processor, etc.) and supporting direct communication and/or wireless communication. The communication module ED90 may include a wireless communication module ED92 (a cellular communication module, a short-range wireless communication module, and a Global Navigation Satellite System (GNSS, etc.) communication module) and/or a wired communication module ED94 (a Local Area Network (LAN) communication) module, a power line communication module, etc.). Among these communication modules, the corresponding communication module may communicate with other electronic devices through a first network ED98 (a short-distance communication network such as Bluetooth, WiFi Direct, or Infrared Data Association (IrDA)) or a second network ED99 (a telecommunication network such as a cellular network, Internet, or a computer network (LAN, WAN, etc.)) These various types of communication modules may be integrated into one component (a single chip, etc.) or implemented as a plurality of components (plural chips) separate from each other. The wireless communication module ED92 may use subscriber information (an International Mobile Subscriber Identifier (IMSI)) stored in the subscriber identification module ED96 to confirm and authenticate the electronic device ED01 in a communication network such as the first network ED98 and/or the second network ED99.

The antenna module ED97 may transmit or receive signals and/or power to or from the outside (e.g., other electronic devices). The antenna may include a radiator having a conductive pattern formed on a substrate (a PCB, etc.) The antenna module ED97 may include one or a plurality of antennas. When the antenna module ED97 includes the plurality of antennas, an antenna suitable for a communication method used in a communication network such as the first network ED98 and/or the second network ED99 may be selected from among the plurality of antennas by the communication module ED90. A signal and/or power may be transmitted or received between the communication module ED90 and another electronic device through the selected antenna. In addition to the antenna, other components (an RFIC, etc.) may be included as a part of the antenna module ED97.

Some of the components may be connected to each other through communication methods between peripheral devices (a bus, General Purpose Input and Output (GPIO), Serial Peripheral Interface (SPI), Mobile Industry Processor Interface (MIPI), etc.) and may interchange signals (commands, data, etc.)

The commands or data may be transmitted or received between the electronic device ED01 and the external electronic device ED04 through the server ED08 connected to the second network ED99. The other electronic devices ED02 and ED04 may be the same type as or different types from the electronic device ED01. All or some of operations performed by the electronic device ED01 may be performed by one or a plurality of other electronic devices ED02, ED04, and ED08. For example, when the electronic device ED01 needs to perform a function or service, the electronic device ED01 may request one or a plurality of other electronic devices to perform part or all of the function or service instead of performing the function or service by itself. The one or plurality of other electronic devices receiving such a request may perform an additional function or service related to the request, and transmit results of performing to the electronic device ED01. For this purpose, cloud computing, distributed computing, and/or client-server computing technologies may be used.

Figure 22:
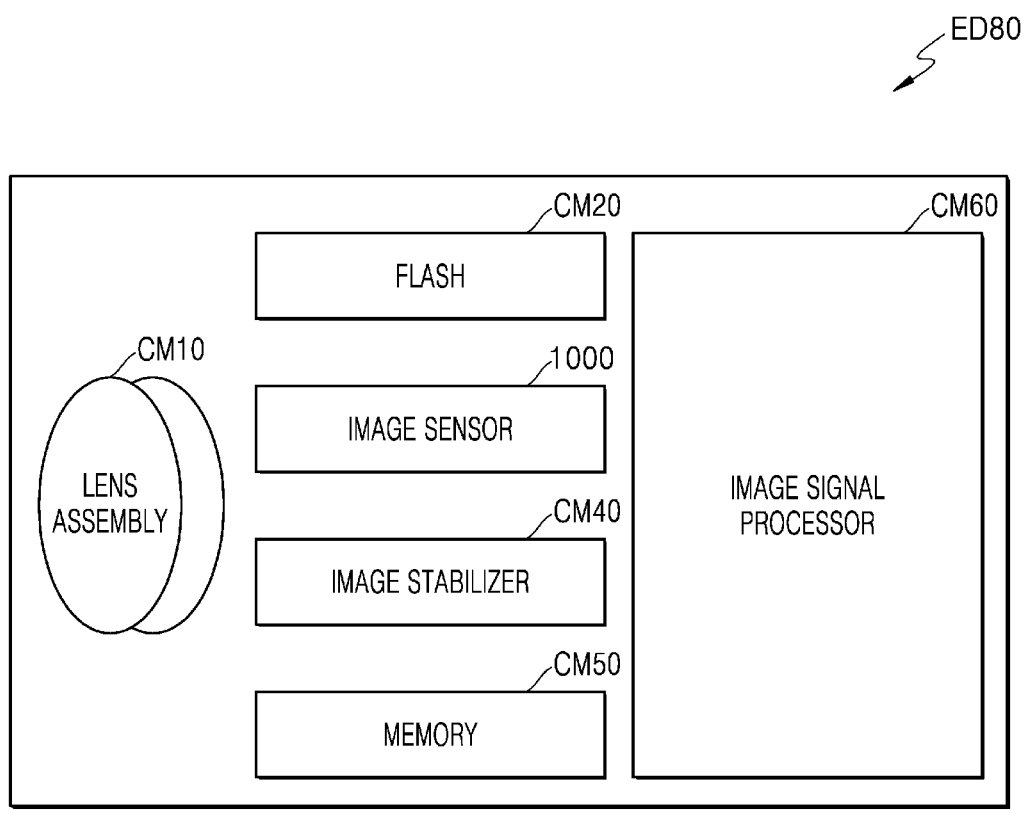
FIG. 22 is a block diagram illustrating a camera module of FIG. 21.

FIG. 22 is a block diagram illustrating the camera module ED80 of FIG. 21.

Referring to FIG. 22, the camera module ED80 may include a lens assembly CM10, a flash CM20, the image sensor 1000 (e.g., the integrated image sensor 100 having an internal feedback of FIG. 1 or the image sensor 1000 of FIG. 20), an image stabilizer CM40, a memory CM50 (a buffer memory, etc.), and/or an image signal processor CM60. The lens assembly CM10 may collect light emitted from a subject, which is an image capturing object. The camera module ED80 may include a plurality of lens assemblies CM10. In this case, the camera module ED80 may be a dual camera, a 360 degree camera, or a spherical camera. Some of the plurality of lens assemblies CM10 may have the same lens properties (angle of view, focal length, auto focus, F number, optical zoom, etc.) or may have different lens properties. The lens assembly CM10 may include a wide-angle lens or a telephoto lens.

The flash CM20 may emit light used to enhance light emitted or reflected from the subject. The flash CM20 may include one or a plurality of light emitting diodes (Red-Green-Blue (RGB) LED, White LED, Infrared LED, Ultraviolet LED, etc.), and/or a Xenon Lamp.

The image sensor 1000 may be the image sensor described with reference to FIG. 1 or 20, and convert the light emitted or reflected from the subject and transmitted through the lens assembly CM10 into an electrical signal, thereby obtaining an image corresponding to the subject. The image sensor 1000 may include one or a plurality of sensors selected from image sensors having different properties, such as an RGB sensor, a black and white (BW) sensor, an IR sensor, or a UV sensor. Each of the sensors included in the image sensor 1000 may be implemented as a Charged Coupled Device (CCD) sensor and/or a Complementary Metal Oxide Semiconductor (CMOS) sensor.

The image stabilizer CM40 may move one or a plurality of lenses or image sensors 1000 included in the lens assembly CM10 in a specific direction in response to a movement of the camera module ED80 or the electronic device CM01 including the camera module ED80 or compensate for a negative influence of the movement by controlling operating characteristics (e.g., adjusting read-out timing) of the image sensor 1000. The image stabilizer CM40 may detect the movement of the camera module ED80 or the electronic device ED01 using a gyro sensor (not shown) or an acceleration sensor (not shown) disposed inside or outside the camera module ED80. The image stabilizer CM40 may be implemented optically or digitally.

The memory CM50 may store some or all data of an image obtained through the image sensor 1000 for a next image processing operation. For example, when a plurality of images are obtained at high speed, the obtained original data (Bayer-patterned data, high-resolution data, etc.) may be stored in the memory CM50, only a low-resolution image may be displayed and then used to transfer the original data of the selected image (user selection, etc.) to the image signal processor CM60. The memory CM50 may be integrated into the memory ED30 of the electronic device ED01 or may be configured as a separate memory operating independently.

The image signal processor CM60 may perform image processing on an image obtained through the image sensor 1000 or image data stored in the memory CM50. Image processing may include depth map generation, 3D modeling, panorama generation, feature point extraction, image synthesis, and/or image compensation (noise reduction, resolution adjustment, brightness adjustment, blurring/deblurring)), sharpening, softening, etc. The image signal processor CM60 may perform control (exposure time control, readout timing control, etc.) on components (the image sensor 1000, etc.) included in the camera module ED80. The image processed by the image signal processor CM60 may be stored back in the memory CM50 for additional processing or may be provided to external components (the memory ED30, the display device ED60, the electronic device ED02, the electronic device ED04, the server ED08, etc.) of the camera module ED80. The image signal processor CM60 may be integrated into the processor ED20 or configured as the processor ED20 and a separate processor operating independently. When the image signal processor CM60 is configured as the processor ED20 and the separate processor, the image processed by the image signal processor CM60 is subjected to additional image processing by the processor ED20 and then displayed through the display device ED60.

The electronic device ED01 may include a plurality of camera modules ED80 having different properties or functions. In this case, one of the plurality of camera modules ED80 may be a wide-angle camera and the other may be a telephoto camera. Similarly, one of the plurality of camera modules ED80 may be a front camera and the other may be a rear camera.

Figure 23:
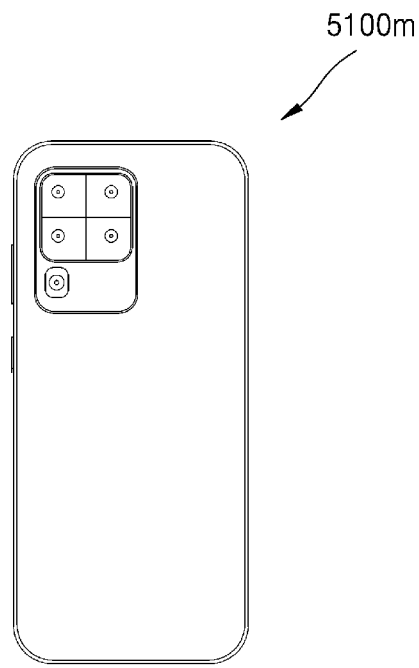
FIGS. 23 to 32 are diagrams illustrating platforms to which an image sensor is applicable.
Figure 24:
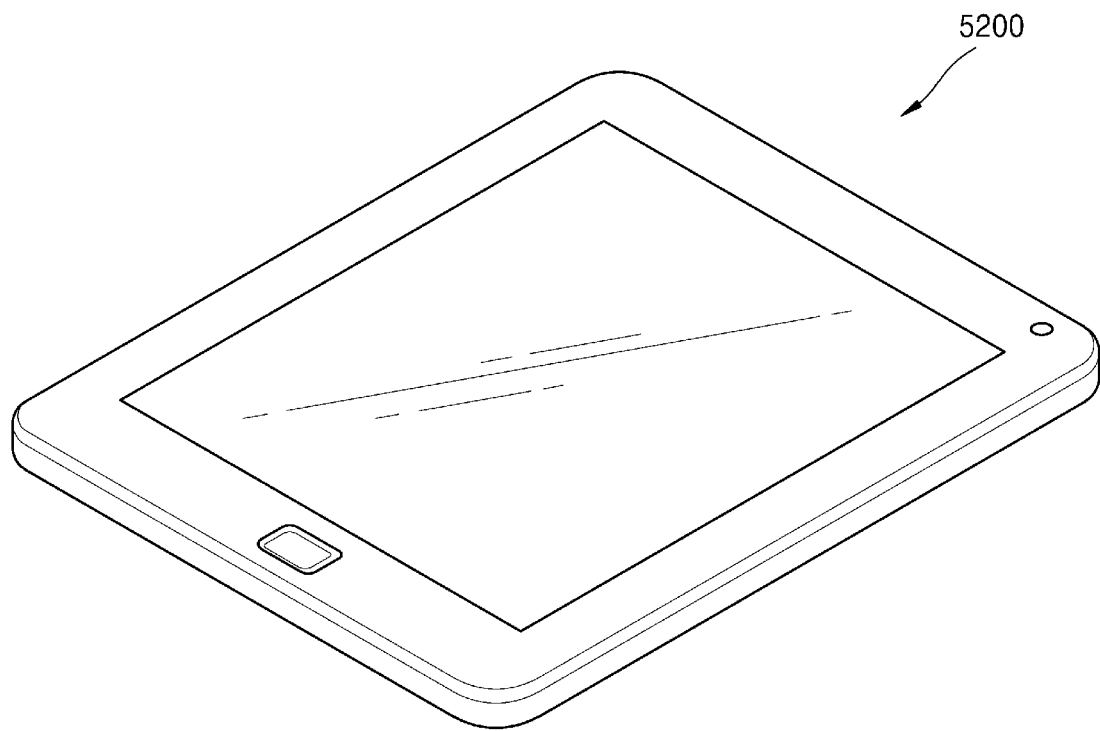
Figure 25:
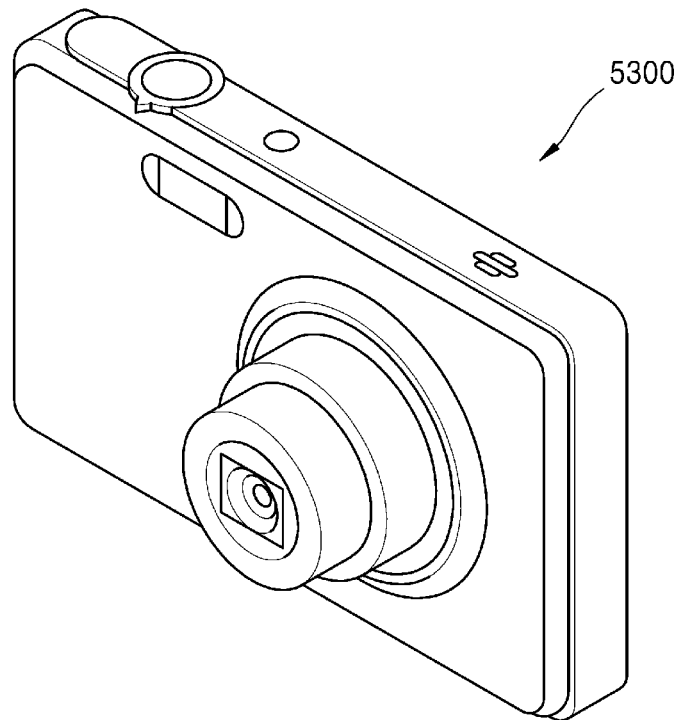
Figure 26:
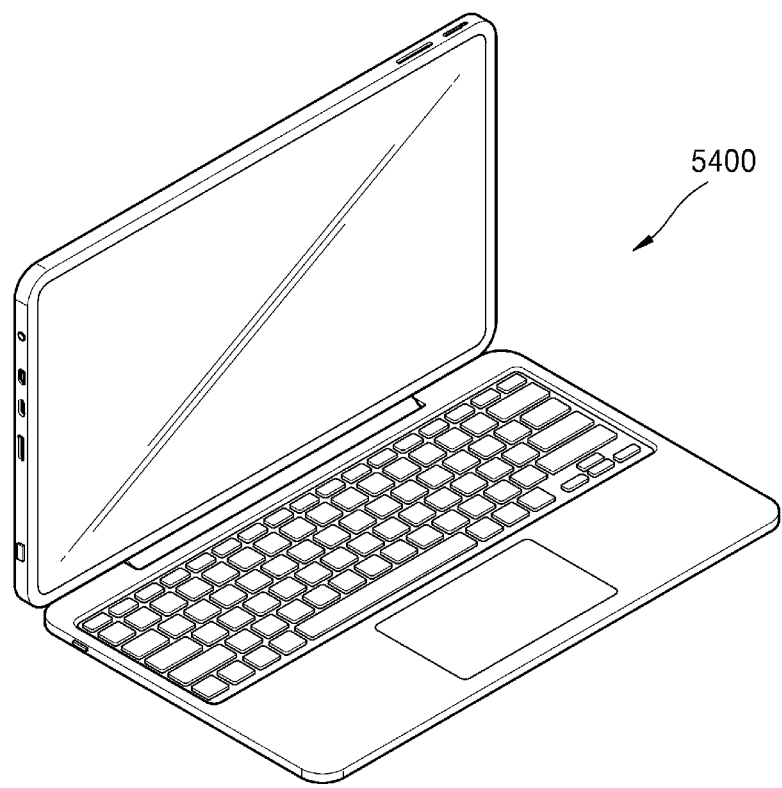
Figure 27:
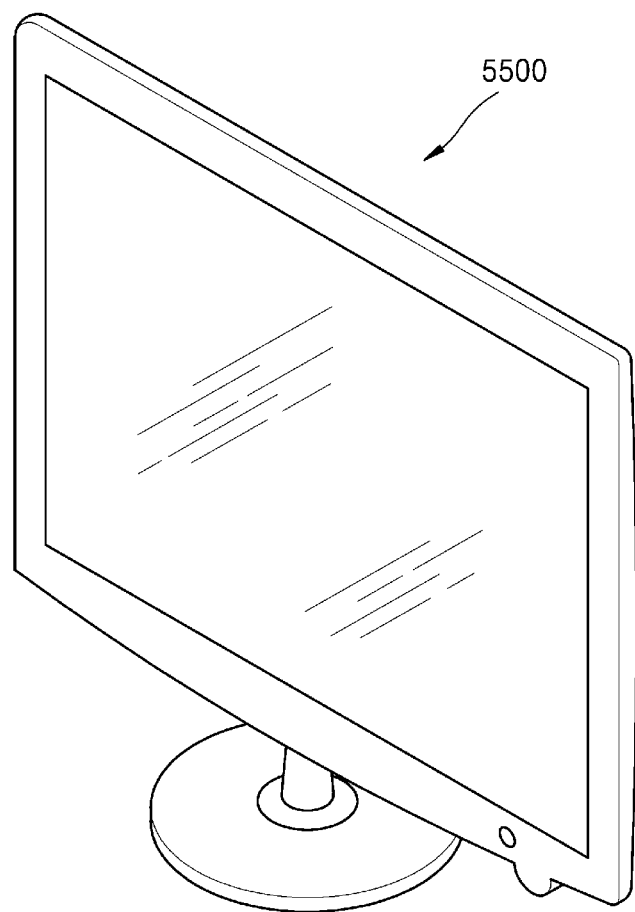

The image sensor 1000 according to embodiments may be applied to a mobile phone or a smart phone 5100m shown in FIG. 23, a tablet or smart tablet 5200 shown in FIG. 24, a digital camera or a camcorder 5300 shown in FIG. 25, a notebook computer 5400 shown in FIG. 26 or a television or a smart television 5500 shown in FIG. 27. For example, the smart phone 5100m or the smart tablet 5200 may include a plurality of high-resolution cameras each having a high-resolution image sensor mounted thereon. Using the high-resolution cameras, depth information of subjects in an image may be extracted, focusing/outfocusing of the image may be adjusted, or subjects in the image may be automatically identified.

Figure 28:
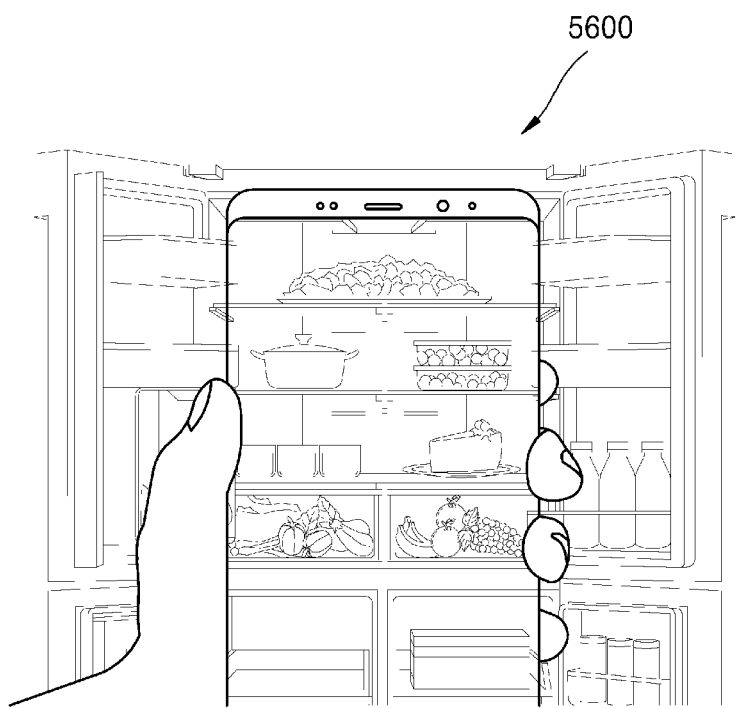
Figure 29:
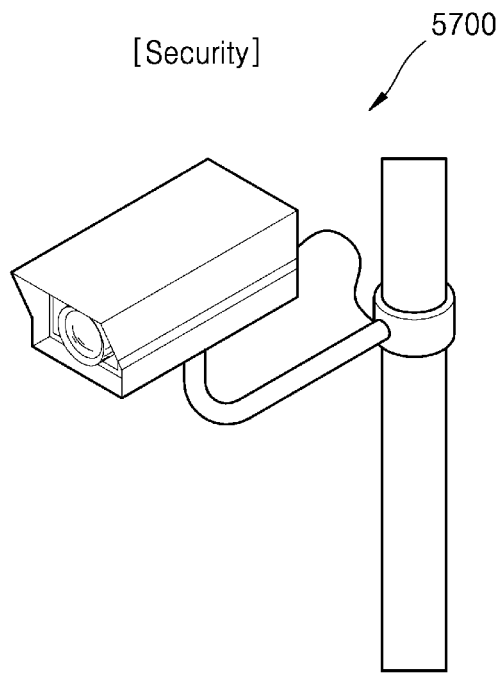
Figure 30:
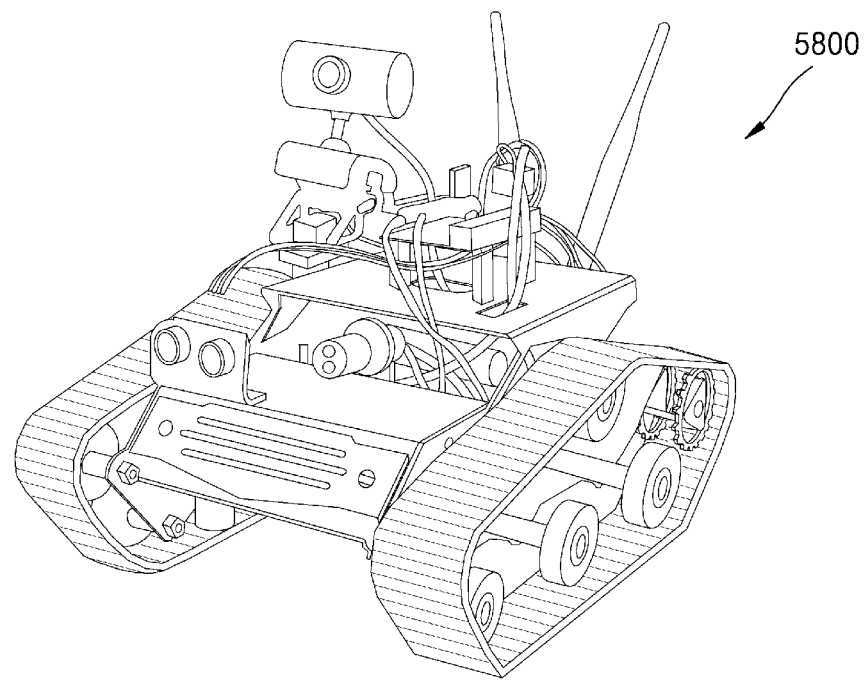
Figure 31:
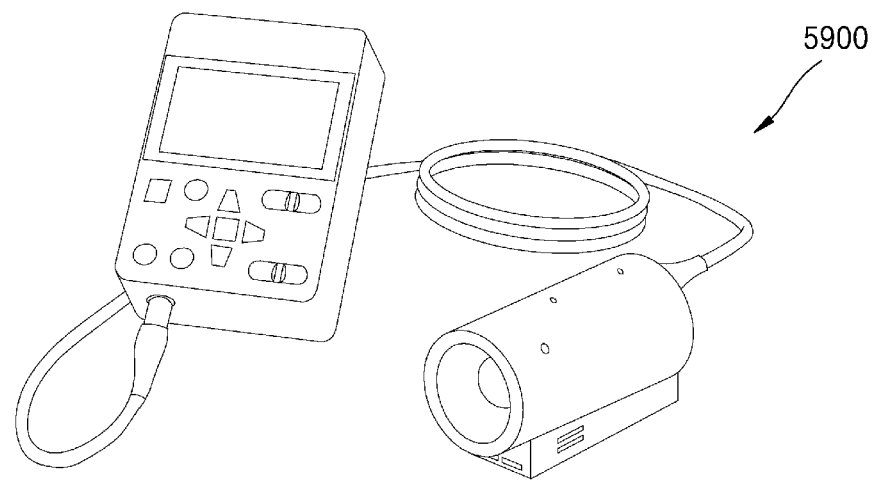

In addition, the image sensor 1000 may be applied to a smart refrigerator 5600 shown in FIG. 28, a security camera 5700 shown in FIG. 29, a robot 5800 shown in FIG. 30, a medical camera 5900 shown in FIG. 31, etc. For example, the smart refrigerator 5600 may automatically recognize food in the smart refrigerator 5600 using an image sensor, and inform the user of the existence of specific food, the type of input or output food, etc. to the user through a smartphone. The security camera 5700 may provide an ultra high-resolution image and may recognize an object or a person in the image even in a dark environment by using high sensitivity. The robot 5800 may be input at a disaster or industrial site that persons may not directly access to provide a high-resolution image. The medical camera 5900 may provide a high-resolution image for diagnosis or surgery, and may dynamically adjust a field of view.

Figure 32:
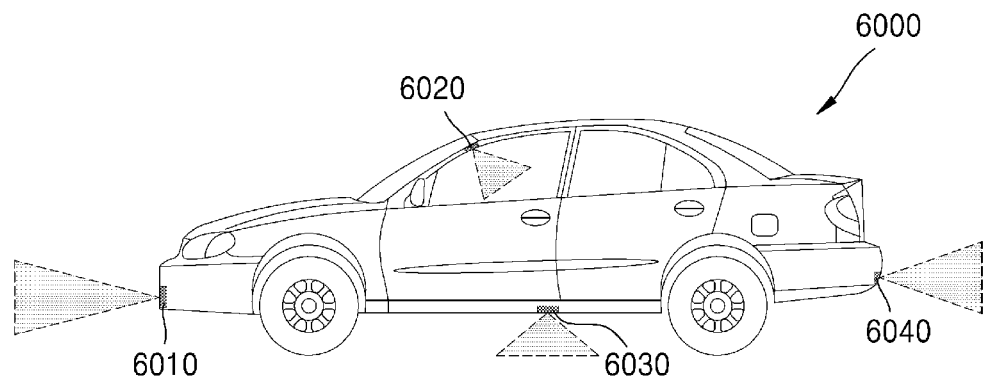

Also, the image sensor 1000 may be applied to a vehicle 6000 as shown in FIG. 32. The vehicle 6000 may include a plurality of vehicle cameras 6010, 6020, 6030, and 6040 arranged at various positions. Each of the vehicle cameras 6010, 6020, 6030, and 6040 may include an image sensor according to embodiments. The vehicle 6000 may provide a variety of information about the inside or surroundings of the vehicle 6000 to a driver by using the plurality of vehicle cameras 6010, 6020, 6030, and 6040, automatically recognize an object or person in the image and provide information necessary for autonomous driving and advanced driver assistance system (ADAS).

Meanwhile, the above described embodiments may be written in a program executable on a computer, and may be implemented on a general purpose digital computer that operates the program using a computer readable recording medium. In addition, the structure of data used in the above described embodiments may be recorded on a computer readable recording medium through various means. The computer readable recording medium includes a storage medium such as a magnetic storage medium (e.g., ROM, floppy disk, hard disk, etc.), an optical reading medium (e.g., CD ROM, DVD, etc.).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An integrated image sensor comprising:
a pixel array;
an analog circuit configured to control the pixel array and read out image data based on an output signal of the pixel array;
a processor configured to generate a control signal for controlling the analog circuit based on the image data and to feed back the control signal to the analog circuit;
and
a memory storing the image data,
wherein the processor analyzes a place where the image data is captured by using algorithms including machine learning, object detection, and image clustering, and
wherein the processor generates the control signal for adjusting an exposure time, a conversion gain, quantity of charge according to the exposure time of a pixel, and a dynamic range based on the place where the image data is captured.

2. The integrated image sensor of claim 1, wherein the processor is further configured to determine a sub region of the image data and feed back information of the sub region to the analog circuit, and
wherein the analog circuit is configured to control pixels corresponding to the sub region or to process the output signal of each of the pixels corresponding to the sub region according to the control signal.

3. The integrated image sensor of claim 2, wherein the processor is further configured to determine the sub region by performing digital image processing on the image data.

4. The integrated image sensor of claim 2, wherein the processor is configured to determine the sub region based on a motion, an object, a color, the dynamic range, or a noise of the image data.

5. The integrated image sensor of claim 2, wherein the analog circuit is configured to adjust the exposure time, the conversion gain, or the dynamic range of the pixels corresponding to the sub region according to the control signal.

6. The integrated image sensor of claim 2, wherein the analog circuit is configured to read out first image data from the pixels that correspond to the sub region, and read out second image data from pixels that do not correspond to the sub region at different frame rates according to the control signal.

7. The integrated image sensor of claim 2, wherein the analog circuit is configured to perform binning on the pixels corresponding to the sub region according to the control signal.

8. The integrated image sensor of claim 1, wherein the processor is configured to determine a first sub region and a second sub region of the image data, and feedback information of the first sub region and the second sub region to the analog circuit, and wherein the analog circuit is configured to control pixels corresponding to the first sub region and pixels corresponding to the second sub region to operate differently from each other, or process first output signals of the pixels corresponding to the first sub region and second output signals of the pixels corresponding to the second sub region differently from each other, according to the control signal.

9. The integrated image sensor of claim 8, wherein the analog circuit is configured to read out first sub image data based on the first output signals of the pixels corresponding to the first sub region, and read out second sub image data based on the second output signals of the pixels corresponding to the second sub region, and wherein the processor is further configured to generate entire image data by combining the first sub image data and the second sub image data based on image registration.

10. The integrated image sensor of claim 1, wherein the analog circuit comprises:

a row select circuit configured to activate pixels of the pixel array; and an analog signal processing circuit configured to read out the image data from the pixel array.

11. A method of operating an integrated image sensor, the method comprising:

reading out image data from a pixel array;

storing the image data;

analyzing a place where the image data is captured by using algorithms including machine learning, object detection, and image clustering, based on the image data, generating a control signal for controlling the pixel array and for controlling an analog circuit configured to read out the image data; and feeding back the control signal to the analog circuit, wherein the control signal is for adjusting an exposure time, a conversion gain, quantity of charge according to the exposure time of a pixel, and a dynamic range based on the place where the image data is captured.

12. The method of claim 11, wherein the generating of the control signal comprises: determining a sub region of the image data, and the feeding back of the control signal comprises: feeding back information of the sub region to the analog circuit.

13. The method of claim 12, wherein the determining of the sub region comprises:

determining the sub region based on a motion, an object, a color, the dynamic range, or a noise of the image data.

14. The method of claim 12, further comprising:

controlling pixels corresponding to the sub region or processing output signals of the pixels corresponding to the sub region according to the control signal.

15. The method of claim 14, wherein the controlling of the pixels corresponding to the sub region or the processing of the output signals of the pixels corresponding to the sub region comprises:

adjusting, according to the control signal, the exposure time, the conversion gain, or the dynamic range of the pixels corresponding to the sub region.

16. The method of claim 14, wherein the controlling of the pixels corresponding to the sub region or the processing of the output signals of the pixels corresponding to the sub region comprises:

performing image readout based on the pixels that correspond to the sub region and performing image readout based on pixels that do not correspond to the sub region at different frame rates according to the control signal.

17. The method of claim 14, wherein the controlling of the pixels corresponding to the sub region or the processing of the output signals of the pixels corresponding to the sub region comprises:

performing binning on the pixels corresponding to the sub region according to the control signal.

18. The method of claim 11, wherein the generating of the control signal comprises:

determining a first sub region and a second sub region of the image data, wherein the feeding back of the control signal to the analog circuit comprises:

feeding back information of the first sub region and the second sub region to the analog circuit, the method further comprising:

controlling first pixels corresponding to the first sub region and second pixels corresponding to the second sub region to operate differently from each other, or processing output signals of the first pixels corresponding to the first sub region and output signals of the second pixels corresponding to the second sub region differently from each other, according to the control signal.

19. The method of claim 18, further comprising:

reading out first sub image data based on the output signals of the first pixels corresponding to the first sub region, and reading out second sub image data based on the output signals of the second pixels corresponding to the second sub region, and generating entire image data by combining the first sub image data and the second sub image data based on image registration.

20. An image sensor comprising:

a pixel array, an analog circuit, and a digital circuit that are integrated into a single chip via a three-dimensional (3D) stacking technology, wherein the analog circuit is configured to control the pixel array and read out image data from the pixel array, and wherein the digital circuit comprises a processor configured to generate a feedback signal based on the image data read by the analog circuit, and provide the feedback signal to the analog circuit to enable the analog circuit to set a region of interest (ROI) and adjust at least one of an exposure time, a conversion gain, or a dynamic range of the image sensor to be applied to the ROI, based on the feedback signal, wherein the processor analyzes a place where the image data is captured by using algorithms including machine learning, object detection, and image clustering, and wherein the processor generates a control signal for adjusting the exposure time, the conversion gain, quantity of charge according to the exposure time of a pixel, and the dynamic range based on the place where the image data is captured.

* * * * *